United States Patent
Nishant et al.

(10) Patent No.: US 12,538,195 B2
(45) Date of Patent: Jan. 27, 2026

(54) METHOD AND USER EQUIPMENT FOR CONTROLLING MOBILITY DURING CONDITIONAL HANDOVER IN WIRELESS NETWORK

(71) Applicant: Samsung Electronics Co., Ltd., Suwon-si (KR)

(72) Inventors: . Nishant, Bangalore (IN); Kailash Kumar Jha, Bangalore (IN); Vivek Murugaiyan, Bangalore (IN); Nitesh Pushpak Shah, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 398 days.

(21) Appl. No.: 18/181,045

(22) Filed: Mar. 9, 2023

(65) Prior Publication Data

US 2023/0362760 A1    Nov. 9, 2023

Related U.S. Application Data

(63) Continuation of application No. PCT/KR2023/002974, filed on Mar. 3, 2023.

(30) Foreign Application Priority Data

May 4, 2022 (IN) .............................. 202241026036

(51) Int. Cl.
    *H04W 36/00*      (2009.01)
(52) U.S. Cl.
    CPC ...... *H04W 36/00837* (2018.08); *H04W 36/13* (2023.05)
(58) Field of Classification Search
    CPC ........... H04W 36/00837; H04W 36/13; H04W 36/008357; H04W 36/362
See application file for complete search history.

(56) References Cited

U.S. PATENT DOCUMENTS 11,026,149 B1 *   6/2021   Goel ..................... H04W 48/20
11,838,820 B2 * 12/2023   Shih ................ H04W 36/00692
(Continued)

FOREIGN PATENT DOCUMENTS

AU        2020102618 A4    11/2020
KR    10-2022-0052820 A     4/2022
(Continued)

OTHER PUBLICATIONS

Performance analysis of bandwidth based handoff algorithm 4G heterogeneous wireless networks based on WDHOP, Jan. 1, 2017.
Huawei, HiSilicon; Slice based Cell (re)selection under network control; 3GPP TSG-RAN WG2 Meeting #112 electronic; R2-2010181; Nov. 2, 2020.
3rd Generation Partnership Project; Technical Specification Group Ran; NR; Study on enhancement of Radio Access Network (RAN) slicing (Release 17), 3GPP TR 38.832 V1.0.0; Sep. 1, 2018.
(Continued)

*Primary Examiner* — Christine Ng
(74) *Attorney, Agent, or Firm* — Jefferson IP Law, LLP

(57) ABSTRACT

A method for controlling mobility of a User Equipment (UE) during conditional handover in a wireless network is provided. The method includes receiving a CHO configuration from a first cell in the wireless network. The method includes initiating a data 5 transmission using a RAN slice(s) with the first cell. The method includes detects a plurality of candidate neighbor cells of the first cell satisfying the CHO configuration. The method includes determines whether a second cell supports the RAN slice(s) from the plurality of the candidate neighbor cells. The method includes 10 executing a CHO request to the second cell to continue the data transmission over the one RAN slice(s).

20 Claims, 16 Drawing Sheets

(56) References Cited

U.S. PATENT DOCUMENTS

| | | |
|---|---|---|
| 2014/0066074 A1 | 3/2014 | Folke et al. |
| 2018/0124661 A1 | 5/2018 | Tsai |
| 2019/0044689 A1 | 2/2019 | Yiu et al. |
| 2019/0124589 A1 | 4/2019 | Bogineni et al. |
| 2020/0053642 A1* | 2/2020 | Huang-Fu ............... H04L 45/85 |
| 2020/0236719 A1 | 7/2020 | Kim et al. |
| 2020/0351694 A1 | 11/2020 | Chen et al. |
| 2020/0383022 A1 | 12/2020 | Shrestha et al. |
| 2022/0022112 A1 | 1/2022 | Lu et al. |
| 2022/0078684 A1 | 3/2022 | Fehrenbach et al. |
| 2022/0232433 A1* | 7/2022 | Xu ........................ H04W 76/27 |
| 2022/0361080 A1* | 11/2022 | Soliman ................ H04W 40/02 |
| 2023/0037553 A1* | 2/2023 | Shih ...................... H04W 36/13 |
| 2023/0232289 A1* | 7/2023 | Zhao ................. H04B 7/18541 370/331 |
| 2023/0300739 A1* | 9/2023 | Nuggehalli ........... H04W 48/16 455/434 |
| 2024/0155452 A1* | 5/2024 | Salmela ................ H04W 36/13 |
| 2024/0163782 A1* | 5/2024 | Ishii ...................... H04W 48/12 |
| 2024/0172081 A1* | 5/2024 | Abad ................ H04W 28/0278 |
| 2024/0334206 A1* | 10/2024 | Christoffersson ..... H04W 72/04 |
| 2025/0097786 A1* | 3/2025 | Gürsu ............... H04W 36/0058 |
| 2025/0133462 A1* | 4/2025 | Liu ....................... H04W 36/14 |

FOREIGN PATENT DOCUMENTS

| | | |
|---|---|---|
| WO | 2020-029701 A1 | 2/2020 |
| WO | 2022/086136 A1 | 4/2022 |

OTHER PUBLICATIONS

3rd Generation Partnership Project; Technical Specification Group Radio Access Network; NR; Radio Resource Control (RRC) protocol specification (Release 15), 3GPP TS 38.331 V15.3.0, Mar. 1, 2021.

European Search Report dated Mar. 24, 2025, issued in European Application No. 23799541.0.

Ahmad Awada et al., A Location-Based Self-Optimizing Algorithm for the Inter-RAT Handover Parameters, IEEE ICC 2013—Wireless Networking Symposium, Nov. 7, 2013, Budapest, Hungary.

Indian Examination Report dated Apr. 8, 2024, issued in Indian Application No. 202241026036.

International Search Report dated May 22, 2023, issued in International Patent Application No. PCT/KR2023/002974.

* cited by examiner

METHOD AND USER EQUIPMENT FOR CONTROLLING MOBILITY DURING CONDITIONAL HANDOVER IN WIRELESS NETWORK

CROSS-REFERENCE TO RELATED APPLICATION(S)

This application is a continuation application, claiming priority under § 365 (c), of an International application No. PCT/KR2023/002974, filed on Mar. 3, 2023, which is based on and claims the benefit of an Indian Patent Application number 202241026036, filed on May 4, 2022, in the Indian Patent Office, the disclosure of which is incorporated by reference herein in its entirety.

FIELD OF INVENTION

The disclosure relates to mobility management. More particularly, the disclosure relates to a method and a user equipment (UE) for controlling mobility during a conditional handover (CHO) in a wireless network.

BACKGROUND

Generally, a user equipment (UE) transmits measurement reports when a radio link of a serving cell (e.g., serving node or serving base station) degrades and/or a radio link of a neighboring cell(s) (e.g., neighbor node/target node) improves over the serving cell based on measurement report configuration. A network (e.g., fifth-generation (5G) wireless network) evaluates conditions of the UE based on the measurement reports and moves a UE connection to the neighbor cell (i.e., handover (HO) process) by sending target cell information to the UE. In a current HO process, there are times when the radio link of the serving cell degrades, causing measurement reports never reach the network, or when a radio resource control (RRC) reconfiguration transferred from the network for a HO fails to never reach the UE, resulting in a failure in a connected mode of the UE.

To address above mentioned issue, a 3rd Generation Partnership Project (3GPP) standard defines a conditional handover (CHO) mechanism in release-16 TS 38.331. In the current CHO mechanism, the network configures the UE with one or more candidate target special cells (SpCells) (e.g., primary cell of a master or secondary cell group/target node(s)) that contain information to perform the HO for the respected candidate target SpCells along with associated conditions to be monitored similar to the measurement reports. The UE evaluates the condition of each configured candidate target SpCell during a CHO execution. The UE uses conditional configuration associated with one of a candidate target SpCell that meets the associated execution condition and allows the CHO to succeed. The network supports multiple candidate target SpCells in the UE for the CHO, according to the Release-16 TS 38.331. Furthermore, multiple candidate target SpCells may satisfy a condition of triggering the CHO at the same time. It is up to a UE implementation to decide which candidate target SpCell to use for the CHO, which is a disadvantage of the current CHO mechanism. Furthermore, the current CHO mechanism only considers signal strength/quality parameters for the CHO, which is another disadvantage of the current CHO mechanism.

For example, a slice-specific application or service may be running in the UE, and the network may have configured multiple candidate target SpCells for the CHO execution. Based on condition criteria, the UE selects one candidate target SpCell from the multiple candidate target SpCells for the CHO execution based on the signal strength/quality parameters, which does not support a Radio Access Network (RAN) slice that is currently running in the UE. In this example, the UE loses a continuity of the slice-specific application and suffers service degradation.

In another example, a data throughput session is ongoing in the UE and the network has configured the multiple candidate target SpCells for the CHO execution. Based on the condition criteria, the UE selects one candidate target SpCell from the multiple candidate target SpCells for the CHO execution based on the signal strength/quality parameters, which has lower bandwidth than other candidate target SpCells. In this example, the UE has a lower throughput after the CHO execution which degrades a quality of service (QOS).

Thus, it is desired to address the above-mentioned disadvantages or other shortcomings or at least provide a useful alternative for controlling the mobility of the UE during the CHO in the network.

The above information is presented as background information only to assist with an understanding of the disclosure. No determination has been made, and no assertion is made, as to whether any of the above might be applicable as prior art with regard to the disclosure.

OBJECT OF INVENTION

Aspects of the disclosure are to address at least the above-mentioned problems and/or disadvantages and to provide at least the advantages described below. Accordingly, an aspect of the disclosure is to provide solutions to select a second cell (e.g., candidate target special cells (SpCells)) when more than one candidate neighbor cells satisfy a condition of triggering a conditional handover (CHO) at the same time to execute the CHO. In first solution, a user equipment (UE) performs the CHO from a first cell to the second cell based on radio access network (RAN) slice information or a RAN slice supported by the second cell that is related to a running service or application in the UE, which allows the UE to maintain service continuity and application quality of service (QOS). In second solution, the UE performs the CHO from the first cell to the second cell based on bandwidth information. The UE selects the second cell with higher bandwidth. The higher bandwidth allows the UE to provide more throughput and a high data rate, which improves performance of the UE Another aspects of the disclosure is to select the second cell based on parameters such as bandwidth of cell, RAN slice associated with cell received in a system information block (SIB) when more than one candidate neighbor cells satisfy the condition of triggering the CHO at the same time to execute the CHO.

Additional aspects will be set forth in part in the description which follows and, in part, will be apparent from the description, or may be learned by practice of the presented embodiments.

SUMMARY

In accordance with an aspect of the disclosure, a method for controlling mobility of a user equipment (UE) in a wireless network is provided. The method includes receiving, by the UE, a conditional handover (CHO) configuration from a first cell in the wireless network. Further, the method includes initiating, by the UE, a data transmission using a radio access network (RAN) slice(s) with the first cell. Further, the method includes detecting, by the UE, a plurality of candidate neighbor cells of the first cell satisfying the CHO configuration. Further, the method includes determining, by the UE, whether a second cell supports the RAN slice(s) from the plurality of the candidate neighbor cells. Further, the method includes executing, by the UE, a CHO request to the second cell to continue the data transmission over the RAN slice(s).

In an embodiment, the method includes receiving, by the UE, bandwidth information from the plurality of the candidate neighbor cells. Further, the method includes executing, by the UE, the CHO request to the second cell from the plurality of the candidate neighbor cells based on the received bandwidth information to continue the data transmission over the RAN slice(s) along with higher throughput.

In an embodiment, the method includes receiving, by the UE, a list of the plurality of the candidate neighbor cells along with the CHO configuration. Further, the method includes executing, by the UE, measurement information of the plurality of the candidate neighbor cells of the list to the wireless network upon receiving the CHO configuration.

In an embodiment, where detecting, by the UE, the plurality of the candidate neighbor cells of the first cell satisfying the CHO configuration includes determining, by the UE, a plurality of conditions associated with each neighbor cell, determining, by the UE, whether the plurality of conditions associated with each neighbor cell meets requirement of the CHO configuration, and detecting, by the UE, the plurality of the candidate neighbor cells, where the plurality of the candidate neighbor cells meets the requirement of the CHO configuration.

In an embodiment, the RAN slice information is received in a system information block (SIB) from the plurality of the candidate neighbor cells.

In an embodiment, the bandwidth information is received in the SIB from the plurality of the candidate neighbor cells.

In an embodiment, where executing, by the UE, the CHO request to the second cell to continue the data transmission over the RAN slice(s) includes identifying, by the UE, the RAN slice(s) is currently being used by an application(s) of the UE, determining, by the UE, whether the identified RAN slice is supported by any neighbor cell of the plurality of the candidate neighbor cells, performing, by the UE, one of, selecting the second cell from the plurality of the candidate neighbor cells in response to determining that the identified RAN slice is supported by any neighbor cell of the plurality of the candidate neighbor cells, where the second cell supports the identified RAN slice, or selecting the second cell based on a reference signal received power (RSRP) and/or a reference signal received quality (RSRQ) and/or/or signal to interference and noise ratio (SINR) in response to determining that the identified RAN slice(s) is not supported by any neighbor cell of the plurality of the candidate neighbor cells, and executing, by the UE, the HO request to the second cell from the plurality of the candidate neighbor cells to continue the data transmission over the RAN slice(s).

In an embodiment, where executing, by the UE, the CHO request to the second cell from the plurality of the candidate neighbor cells based on the received bandwidth information to continue the data transmission over the RAN slice(s) along with the higher throughput includes determining, by the UE, the bandwidth information associated with the plurality of the candidate neighbor cells, determining, by the UE, whether any neighbor cell has a higher bandwidth than the other candidate neighbor cells and the first cell, performing, by the UE, one of, selecting the second cell from the plurality of the candidate neighbor cells in response to determining that any neighbor cell has the higher bandwidth than the other candidate neighbor cells and the first cell, where the second cell has the higher bandwidth than the other candidate neighbor cells and the first cell, or selecting the second cell based on the RSRP and/or the RSRQ and/or the SINR in response to determining that all neighbor cell has a lower bandwidth than the first cell, and executing, by the UE, the CHO request to the second cell from the plurality of the candidate neighbor cells to resume the data transmission over the RAN slice(s) along with the higher throughput.

In an embodiment, the method includes identifying, by the UE, that the RAN slice(s) is currently being used by the application(s) of the UE. Further, the method includes determining, by the UE, whether the identified RAN slice is supported by any neighbor cell, and whether any neighbor cell has the higher bandwidth than the other candidate neighbor cells and the first cell. Further, the method includes performing, by the UE, one of, selecting the second cell from the plurality of the candidate neighbor cells in response to determining that the identified RAN slice is supported by any neighbor cell and any neighbor cell of has the higher bandwidth than the other candidate neighbor cells and the first cell, where the second cell supports the identified RAN slice(s) and the second cell has the higher bandwidth than the other candidate neighbor cells and the first cell, or selecting the second cell based on the RSRP and/or the RSRQ and/or the SINR in response to determining that the identified RAN slice(s) is not supported by any neighbor cell of and all neighbor cell has the lower bandwidth than the first cell. Further, the method includes executing, by the UE, the CHO request to the second cell from the plurality of the candidate neighbor cells to resume the data transmission over the RAN slice(s) along with the higher throughput.

In accordance with another aspect of the disclosure, a method for controlling mobility of the UE in the wireless network is provided. The method includes receiving the CHO configuration from the first cell in the wireless network. Further, the method includes initiating the data transmission with the first cell. Further, the method includes detecting the plurality of candidate neighbor cells of the first cell satisfying the CHO configuration. Further, the method includes receiving the bandwidth information from the plurality of the candidate neighbor cells. Further, the method includes executing the CHO request to the second cell from the plurality of the candidate neighbor cells based on the received bandwidth information to continue the data transmission along with higher throughput.

In accordance with another aspect of the disclosure, a method for controlling mobility of the UE in the wireless network is provided. The method includes receiving the CHO configuration from the first cell in the wireless network. Further, the method includes initiating the data transmission with the first cell. Further, the method includes detecting the plurality of candidate neighbor cells of the first cell satisfying the CHO configuration. Further, the method includes determining whether the second cell supports the RAN slice from the plurality of the candidate neighbor cells. Further, the method includes receiving the bandwidth information from the plurality of the candidate neighbor cells. Further, the method includes executing the CHO request to the second cell based on the supported RAN slice and/or the received bandwidth information to continue the data transmission over the RAN slice along with higher throughput.

In accordance with another aspect of the disclosure, a UE for controlling the mobility of the UE in the wireless network is provided. The UE includes a CHO controller coupled with a processor and a memory. The CHO controller receives the CHO configuration from the first cell in the wireless network. Further, the CHO controller initiates the data transmission using the RAN slice(s) with the first cell. Further, the CHO controller detects the plurality of candidate neighbor cells of the first cell satisfying the CHO configuration. Further, the CHO controller determines whether the second cell supports the RAN slice(s) from the plurality of the candidate neighbor cells. Further, the CHO controller executes the CHO to the second cell to continue the data transmission over the RAN slice(s).

In accordance with another aspect of the disclosure, a UE for controlling the mobility of the UE in the wireless network is provided. The UE includes the CHO controller coupled with the processor and the memory. The CHO controller receives the CHO configuration from the first cell in the wireless network. Further, the CHO controller initiates the data transmission with the first cell. Further, the CHO controller detects the plurality of candidate neighbor cells of the first cell satisfying the CHO configuration. Further, the CHO controller receives the bandwidth information from the plurality of the candidate neighbor cells. Further, the CHO controller executes the CHO to the second cell from the plurality of the candidate neighbor cells based on the received bandwidth information to continue the data transmission along with higher throughput.

In accordance with another aspect of the disclosure, a UE for controlling the mobility of the UE in the wireless network is provided. The UE includes the CHO controller coupled with the processor and the memory. The CHO controller receives the CHO configuration from the first cell in the wireless network. Further, the CHO controller initiates the data transmission using the RAN slice(s) with the first cell. Further, the CHO controller detects the plurality of candidate neighbor cells of the first cell satisfying the CHO configuration. Further, the CHO controller determines whether the second cell supports the RAN slice(s) from the plurality of the candidate neighbor cells. Further, the CHO controller receives the bandwidth information from the plurality of the candidate neighbor cells. Further, the CHO controller executes the CHO to the second cell from the plurality of the candidate neighbor cells based on the supported RAN slice and/or the received bandwidth information to continue the data transmission over the RAN slice(s) along with higher throughput.

Other aspects, advantages, and salient features of the disclosure will become apparent to those skilled in the art from the following detailed descriptions, which, taken in conjunction with the annexed drawings, discloses various embodiments of the disclosure.

BRIEF DESCRIPTION OF FIGURES

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF INVENTION

Figure 1:
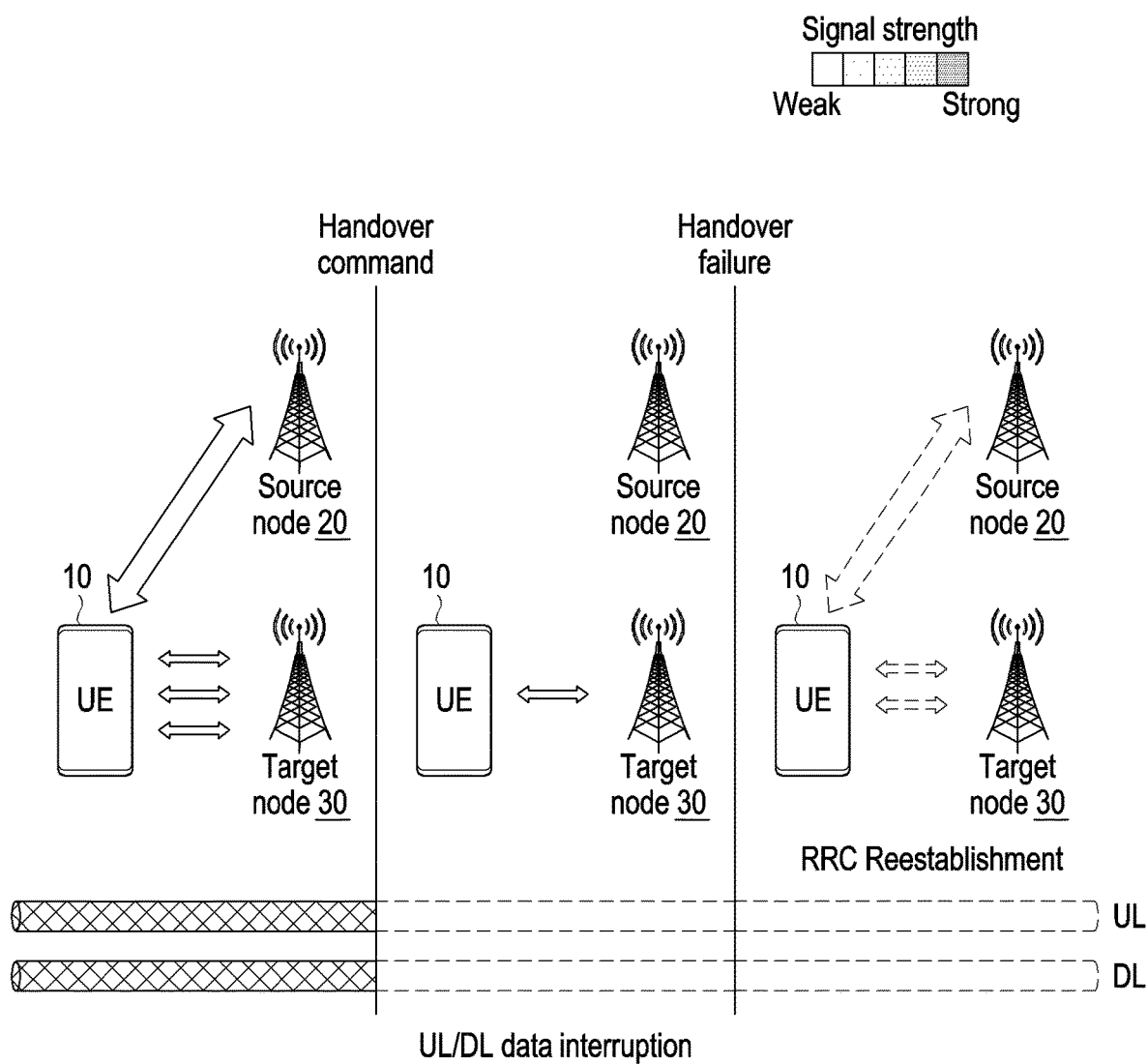
FIG. 1 illustrates a problem scenario in an existing handover (HO) mechanism, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "first cell" and "source node" are used interchangeably and denotes the same. The terms "plurality of candidate neighbor cells" and "target nodes" are used interchangeably and denotes the same. The terms "second cell" and "target node" are used interchangeably and denote the same. The terms "Bandwidth" and "B.W." are used interchangeably and denote the same. The terms "candidate" and "neighbor" are used interchangeably and denote the same. The terms "node" and "cell" are used interchangeably and denote the same.

FIG. 1 illustrates a problem scenario in an existing handover (HO) mechanism, according to the related art.

In the current normal HO mechanism, a user equipment (UE) (10) transmits measurement reports based on measurement report configuration in the UE (10) and a network (e.g., source node (20)) evaluates the UE (10) conditions and moves a UE connection to a neighbor cell (e.g., target node (30)) by sending target cell information to the UE (10). In the current normal HO mechanism, the UE (10) is provided with only one target node (30) for HO using handover command and cases can occur of radio link becomes degraded due to a mobility of the UE (10) and fluctuated signal strength of the target node (30). This cause the measurement reports never to reach the network (e.g., target node (30)) or an RRC-reconfiguration for HO fails to reach the UE (10) which leads to handover failure of the UE (10) in a connected mode and cause interruption of data connection in the UE (10). In order to overcome this issue and increase the robustness in the HO process and reduce data interruption time, conditional handover (CHO) is introduced in which the UE (10) is provided with multiple target information to perform the HO.

Figure 2A:
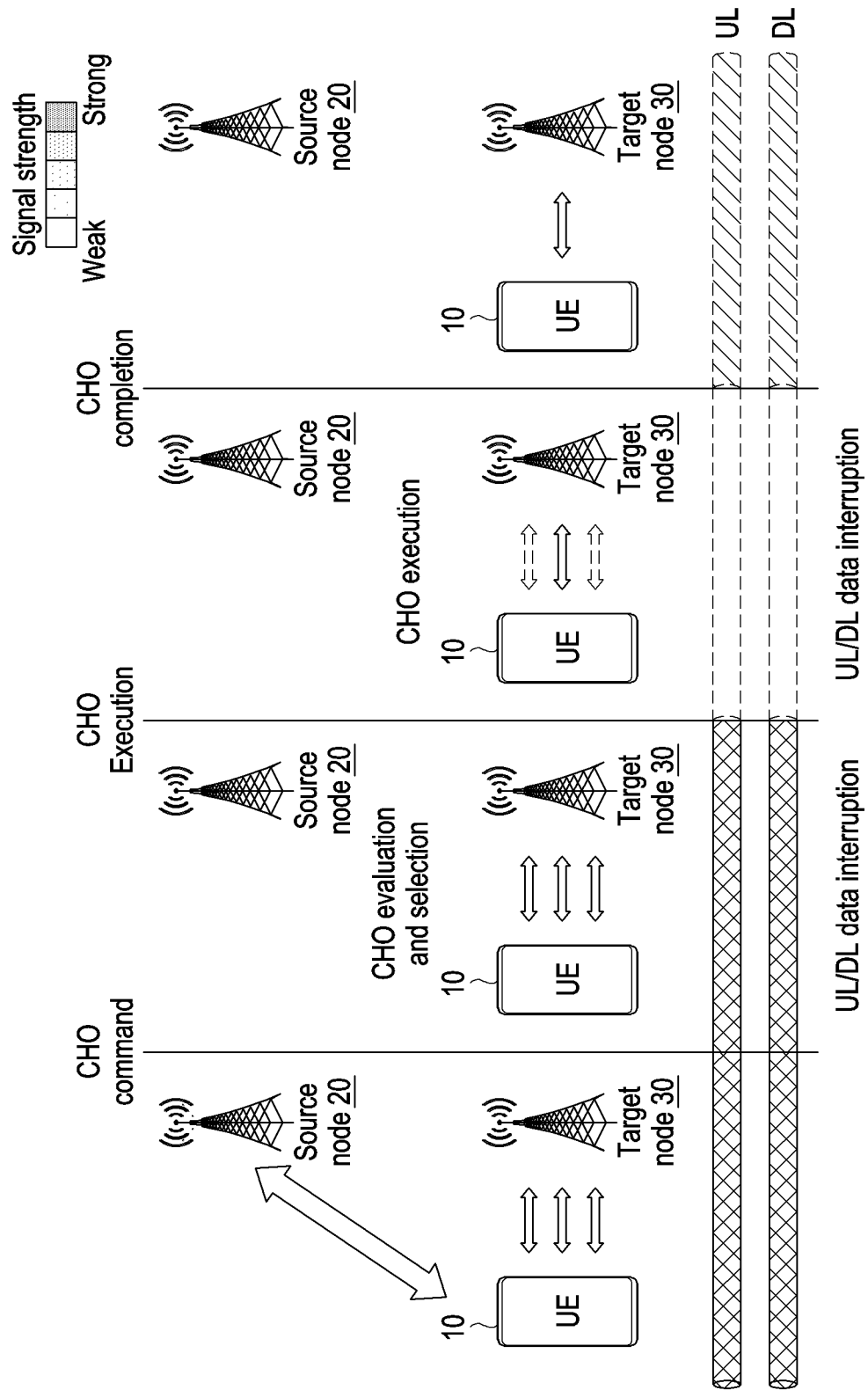
FIGS. 2A and 2B illustrate a problem scenario in an existing conditional handover (CHO) mechanism, according to the related art.
Figure 2B:
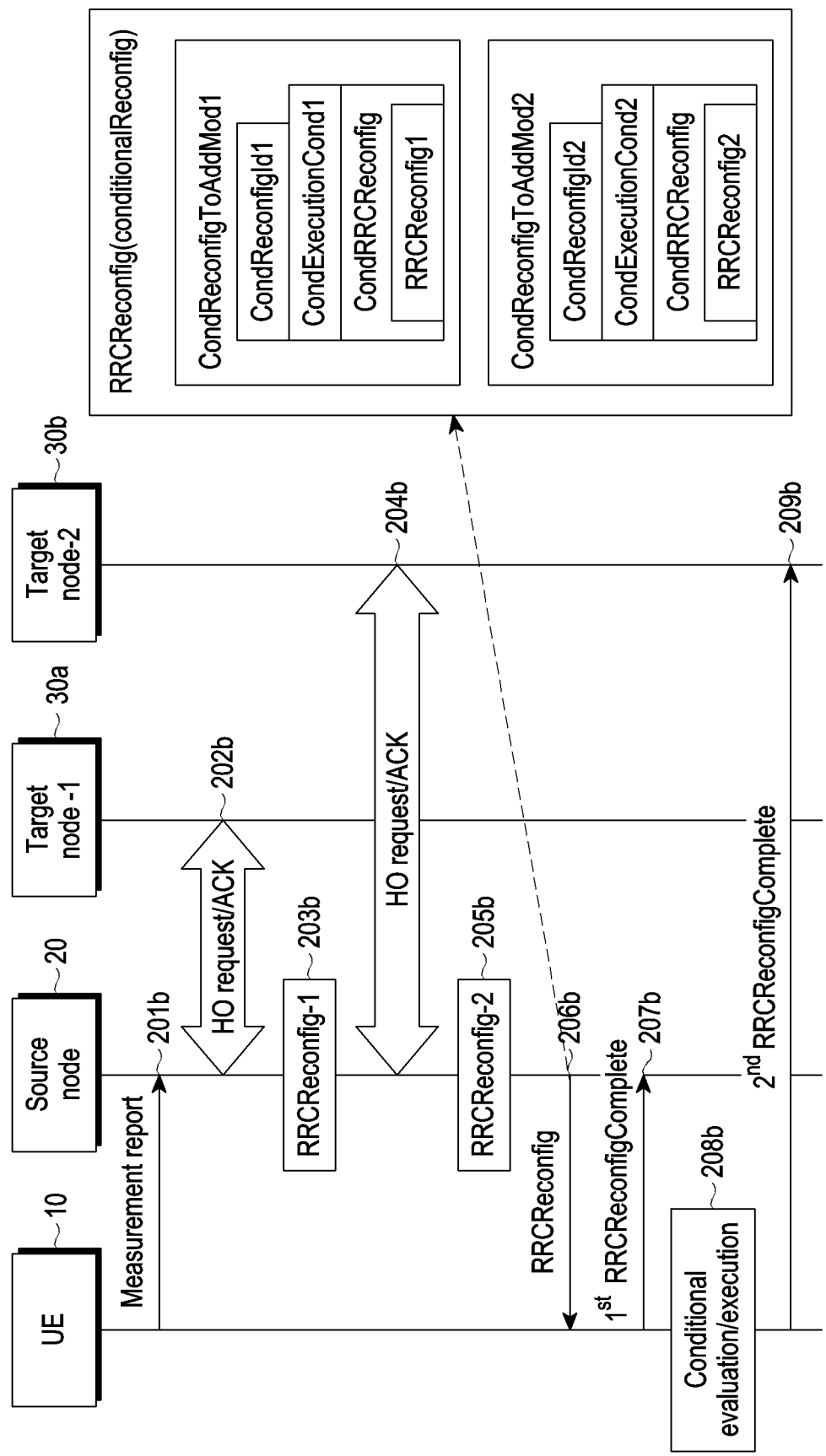

FIGS. 2A and 2B illustrate a problem scenario in an existing conditional handover (CHO) mechanism, according to the related art.

Referring to FIG. 2A, in the current CHO mechanism, the network (e.g., source node (20)) configures the UE (10) with one or more candidate target special cells (SpCells) (e.g., target nodes (30)) in a conditional reconfiguration which contains information to perform CHO for respected candidate target Spcells (e.g., target node (30)) along with conditions to be monitored similar to the measurement reports/information. The UE (10) evaluates the condition of each configured candidate target SpCells (e.g., target nodes 30) and applies conditional configuration associated with one of the candidate target SpCells (e.g., target nodes 30) which fulfils associated execution condition and through which CHO gets success. As the UE (10) configures with multiple candidate target Spcells (e.g., target nodes 30) and the UE (10) chooses the target node (30) to perform the HO based on CHO evaluation condition, the chance of the HO failure gets reduced than the current normal HO mechanism and so the current CHO mechanism increases robustness of process of the HO.

Furthermore, multiple candidate target SpCells (e.g., target nodes 30) may satisfy the condition of triggering the CHO at the same time. It is up to the UE (10) implementation to decide which candidate target SpCell (e.g., target node 30) to use for the CHO, which is a disadvantage of the current CHO mechanism. Furthermore, the current CHO mechanism only considers signal strength/quality parameters for the CHO, which is another disadvantage of the current CHO mechanism.

Referring to FIG. 2B, at operation 201b, the UE (10) sends the measurement reports to the source node (20) when the UE (10) is in the connected mode. The measurement reports contain a list of measurement objects. At operation 202b-206b, the source node (20) evaluates the measurement object and sends a radio resource control (RRC) reconfiguration message (i.e., RRCReconfig-1 and RRCReconfig-2) with a list of candidate cells (i.e., target node-1 (30a) and target node-2 (30b)). Each candidate node (30a and 30b) contains a pair of conditions to be evaluated and RRC reconfiguration information which contains reconfiguration with sync structure which can be applied and perform the HO when condition met for the candidate node (30*a* and 30*b*).

At operation 207*b*-209*b*, the UE (10) sends an RRC reconfiguration complete message (i.e., 1st RRCReconfig-Complete and 2nd RRCReconfigComplete) upon receiving the RRC reconfiguration message and stores the candidate cell information in the UE (10). The UE (10) then starts evaluating candidate cell conditions which can be paired with the measurement object and reporting configuration of measurement event (e.g., A3/A5) same like measurement configuration. Once the evaluation condition satisfies the measurement object and a candidate cell (e.g., target node-1 (30*a*)) which satisfies the condition is the candidate cell that contains the information, the UE (10) applies the RRC reconfiguration information associated with the candidate cell and performs the CHO. Evaluation conditions may be satisfied for multiple candidate cells. And, it is up to the UE (10) to select which candidate cell for CHO configuration. Once the CHO completes, the UE (10) sends the RRC reconfiguration complete message to the corresponding candidate cell (e.g., target node-2 (30*b*)) for CHO completion.

Figure 3A:
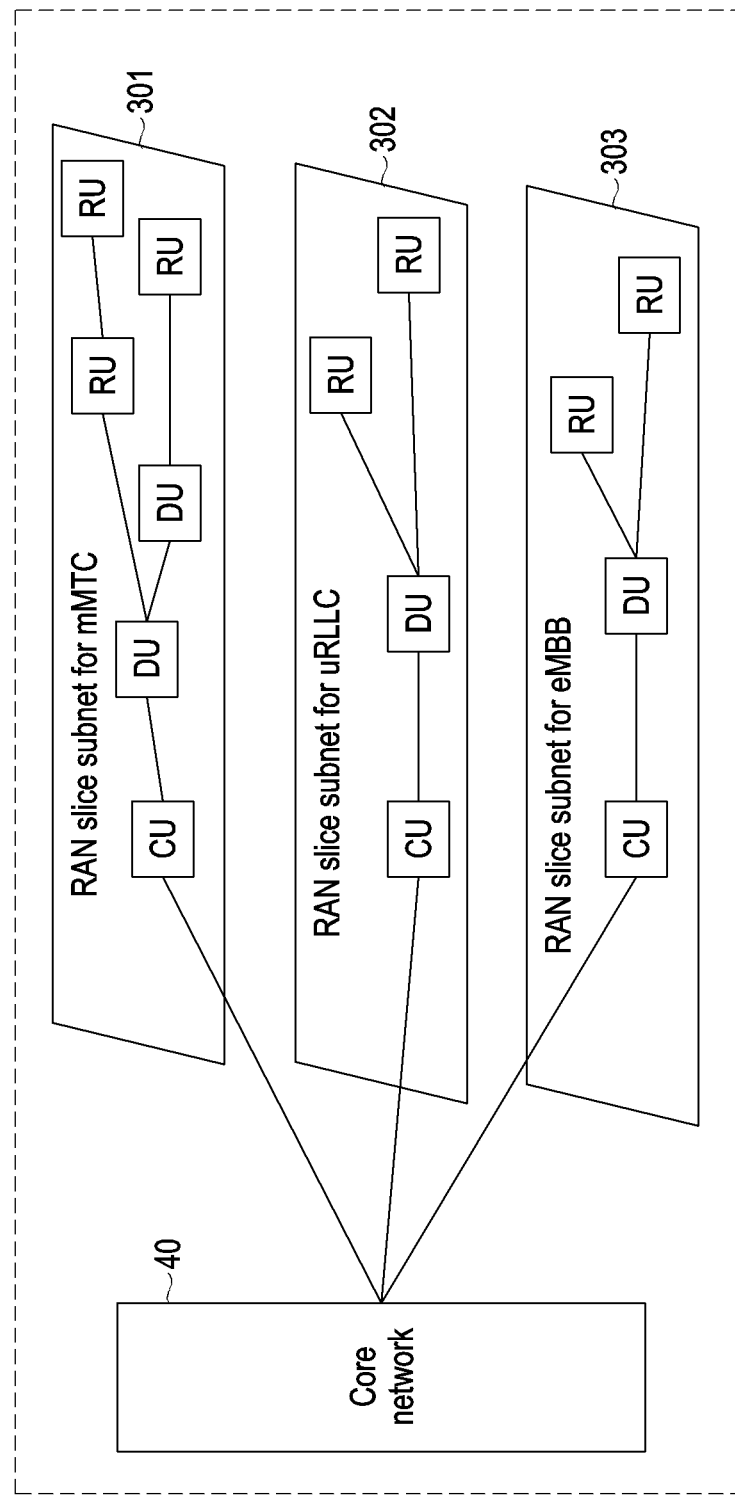
FIGS. 3A and 3B illustrate functionality of a Radio Access Network (RAN) slice, according to the related art.
Figure 3B:
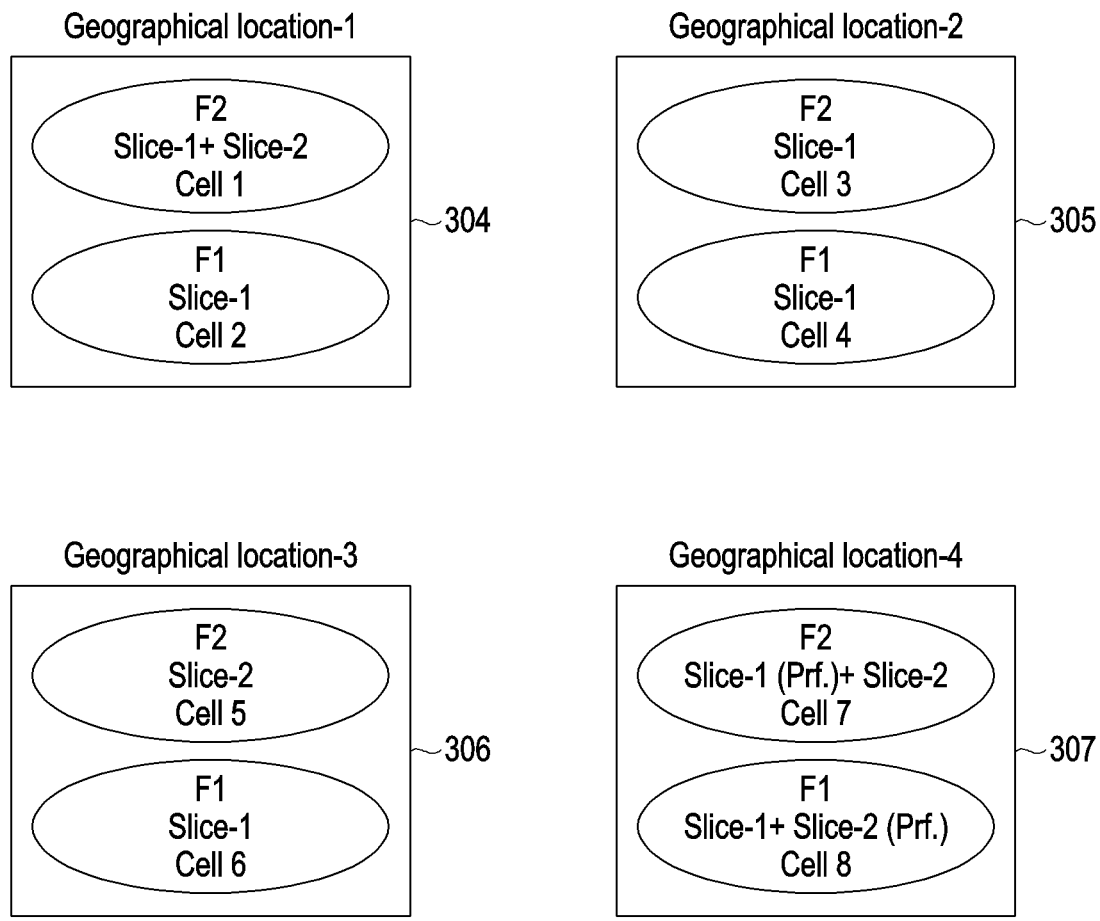

FIGS. 3A and 3B illustrate functionality of a radio access network (RAN) slice, according to the related art.

Referring to FIG. 3A, in general, 5G networks (core network (40)) are intended to accelerate the digital transformation of a wide range of industry verticals, including enhanced mobile broadband (eMBB) (303), ultra-reliable low-latency communication (URLLC) (302), and massive machine-type communication (mMTC) (301). These verticals offer a wide range of unprecedented services with varying functional and performance requirements by using one or more centralized unit (CU), distributed unit (DU), and radio unit (RU).

Radio access network (RAN) slicing allows an operator to offer optimal support for different types of services to different types of customer segments by partitioning a single physical network into multiple virtual networks (e.g., mMTC 301, uRLLC 302, and eMBB 303). It defines a RAN slice subnet as a collection of next generation node Bs (gNBs) arranged and configured to perform a specific RAN function. Each RAN slice subnet has a set of configuration descriptors that are used to parameterize the features, policies, and radio resources associated with the specific service.

Referring to FIG. 3B, according to third generation partnership project (3GPP) TR 38.832v1.0.0, multiple deployment scenarios can be used to provide different services to the UE. For example, a slice-1 refers to the eMBB, while a slice-2 refers to the URLLC. "Cell 1 to Cell 8" represents a group of cells.

Geographical location-1 (304) is deployed in a factory or a hospital. F1 supports slice-1 (e.g., eMBB) in this location, whereas F2 supports both slice-1 and slice-2 (e.g., eMBB and URLLC). The public area is located at geographical location-2 (305). For smart phone users, F1 and F2 all support slice-1 (e.g., eMBB), but no slice-2 (e.g., URLLC) is supported in geographical location-2 (305). F2 is also used as a hotspot to provide wideband access. Geographical location-3 (306) demonstrates how different slices are supported on various frequencies. F1 can only support slice-1, while F2 can only support slice-2. Geographical location-4 (307) depicts a common scenario in which slices are available via multiple frequencies. And one or more frequencies are preferred for each slice, for example, F1 is preferred for slice-2 and F2 is preferred for slice slice-1 in the geographical location-4 (307).

The eMBB and URLLC slices are only used as examples of different slices. It is up to network implementation to deploy any slice on any frequency band.

A common understanding in RAN2 is that the intended slice is based on the information access stratum (AS) receives from non-access stratum (NAS) for the specific use case. This may vary depending on the situation:

The intended slice in a case of cell selection and reselection refers to the allowed or requested single-network slice selection assistance information (S-NSSAI(s)).

When registering for a first time or requesting a new S-NSSAI(s), the intended slices is equal to S-NSSAI(s) requested.

In a case of idle-mode mobility, the intended slices is equal to allowed S-NSSAI(s).

According to 3GPP standards technical document, the network will broadcast the RAN slice information in system information block (SIB) to the UEs using which UE will determine the supported RAN slice services in the cell.

Accordingly, embodiments herein disclose a method for controlling mobility of a UE in a wireless network. The method includes receiving, by the UE, a CHO configuration from a first cell in the wireless network. Further, the method includes initiating, by the UE, a data transmission using a radio access network (RAN) slice(s) with the first cell. Further, the method includes detecting, by the UE, a plurality of candidate neighbor cells of the first cell satisfying the CHO configuration. Further, the method includes determining, by the UE, whether a second cell supports the RAN slice(s) from the plurality of the candidate neighbor cells. Further, the method includes executing, by the UE, a CHO to the second cell to continue the data transmission over the RAN slice(s).

Accordingly, embodiments herein disclose a method for controlling mobility of the UE in the wireless network. The method includes receiving the CHO configuration from the first cell in the wireless network. Further, the method includes initiating the data transmission with the first cell. Further, the method includes detecting the plurality of candidate neighbor cells of the first cell satisfying the CHO configuration. Further, the method includes receiving the bandwidth information from the plurality of the candidate neighbor cells. Further, the method includes executing the CHO to the second cell from the plurality of the candidate neighbor cells based on the received bandwidth information to continue the data transmission along with higher throughput.

Accordingly, embodiments herein disclose a method for controlling mobility of the UE in the wireless network. The method includes receiving the CHO configuration from the first cell in the wireless network. Further, the method includes initiating the data transmission with the first cell. Further, the method includes detecting the plurality of candidate neighbor cells of the first cell satisfying the CHO configuration. Further, the method includes determining whether the second cell supports the RAN slice from the plurality of the candidate neighbor cells. Further, the method includes receiving the bandwidth information from the plurality of the candidate neighbor cells. Further, the method includes executing the CHO to the second cell based on the supported RAN slice and/or the received bandwidth information to continue the data transmission over the RAN slice along with higher throughput.

Accordingly, embodiments herein disclose the UE for controlling mobility of the UE in the wireless network. The UE includes a CHO controller coupled with a processor and a memory. The CHO controller receives the CHO configuration from the first cell in the wireless network. Further, the CHO controller initiates the data transmission using the RAN slice(s) with the first cell. Further, the CHO controller detects the plurality of candidate neighbor cells of the first cell satisfying the CHO configuration. Further, the CHO controller determines whether the second cell supports the RAN slice(s) from the plurality of the candidate neighbor cells. Further, the CHO controller executes the CHO to the second cell to continue the data transmission over the RAN slice(s).

Accordingly, embodiments herein disclose the UE for controlling mobility of the UE in the wireless network. The UE includes a CHO controller coupled with a processor and a memory. The CHO controller receives the CHO configuration from the first cell in the wireless network. Further, the CHO controller initiates the data transmission with the first cell. Further, the CHO controller detects the plurality of candidate neighbor cells of the first cell satisfying the CHO configuration. Further, the CHO controller receives the bandwidth information from the plurality of the candidate neighbor cells. Further, the CHO controller executes the CHO to the second cell from the plurality of the candidate neighbor cells based on the received bandwidth information to continue the data transmission along with higher throughput.

Accordingly, embodiments herein disclose the UE for controlling mobility of the UE in the wireless network. The UE includes a CHO controller coupled with a processor and a memory. The CHO controller receives the CHO configuration from the first cell in the wireless network. Further, the CHO controller initiates the data transmission using the RAN slice(s) with the first cell. Further, the CHO controller detects the plurality of candidate neighbor cells of the first cell satisfying the CHO configuration. Further, the CHO controller determines whether the second cell supports the RAN slice(s) from the plurality of the candidate neighbor cells. Further, the CHO controller receives the bandwidth information from the plurality of the candidate neighbor cells. Further, the CHO controller executes the CHO request to the second cell from the plurality of the candidate neighbor cells based on the supported RAN slice and/or the received bandwidth information to continue the data transmission over the RAN slice(s) along with higher throughput.

Unlike existing methods and systems, the proposed method allows the UE to provide solutions to select a second cell (e.g., candidate target SpCells) when more than one candidate neighbor cells satisfy a condition of triggering a CHO at the same time to execute the CHO. In first solution, the UE performs the CHO from the first cell to the second cell based on the RAN slice information or RAN slice supported by the second cell that is related to a running application in the UE, which allows the UE to maintain service continuity and application quality of service (QOS). In second solution, the UE performs the CHO from the first cell to the second cell based on bandwidth information. The UE selects the second cell with higher bandwidth. The higher bandwidth allows the UE to provide more throughput and a high data rate, which improves performance of the UE.

Unlike existing methods and systems, the proposed method allows the UE to select the second cell based on parameters received in a SIB when more than one candidate neighbor cells satisfy the condition of triggering the CHO at the same time to execute the CHO.

Referring now to the drawings, and more particularly to FIGS. 4, 5, 6A, 6B, 7, 8, 9A, 9B 10, 11, 12A, 12B, 13 and 14, where similar reference characters denote corresponding features consistently throughout the figures, there are shown preferred embodiments.

Figure 4:
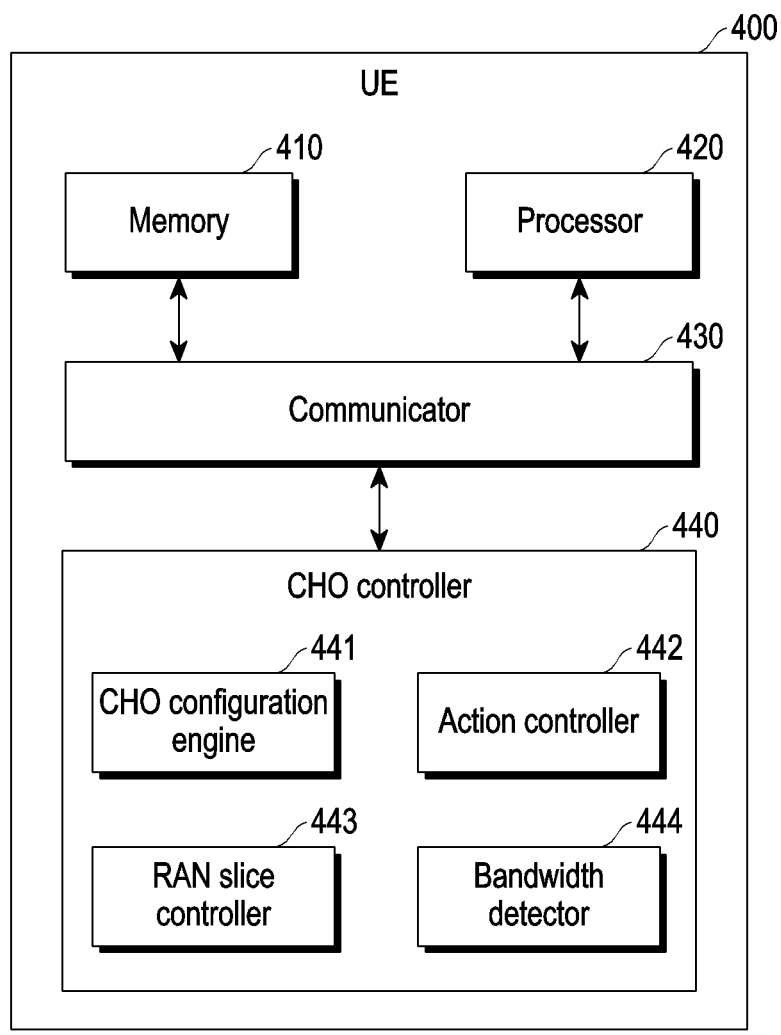
FIG. 4 illustrates a block diagram of a user equipment (UE) for controlling mobility during a CHO, according to an embodiment of the disclosure.

FIG. 4 illustrates a block diagram of a UE for controlling mobility during a CHO, according to an embodiment of the disclosure. Examples of the UE (400) include, but are not limited to a smartphone, a tablet computer, a personal digital assistance (PDA), an internet of things (IoT) device, a wearable device, etc.

In an embodiment, the UE (400) includes a memory (410), a processor (420), a communicator (430), and a CHO controller (440).

In an embodiment, the memory (410) may store a list of the plurality of the candidate neighbor cells (600) (not shown in FIG. 4), measurement information of the plurality of the candidate neighbor cells (600), RAN slice information of the candidate neighbor cells (600), and bandwidth information of the candidate neighbor cells (600). The memory (410) may store instructions to be executed by the processor (420). The memory (410) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (410) may, in some examples, be considered a non-transitory storage medium. The term "non-transitory" may indicate that the storage medium is not embodied in a carrier wave or a propagated signal. However, the term "non-transitory" should not be interpreted that the memory (410) is non-movable. In some examples, the memory (410) can be configured to store larger amounts of information than the memory. In certain examples, a non-transitory storage medium may store data that can, over time, change (e.g., in random access memory (RAM) or cache). The memory (410) can be an internal storage unit or it can be an external storage unit of the UE (400), a cloud storage, or any other type of external storage.

The processor (420) may communicate with the memory (410), the communicator (430), and CHO controller (440). The processor (420) may be configured to execute instructions stored in the memory (410) and to perform various processes. The processor (420) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an artificial intelligence (AI) dedicated processor such as a neural processing unit (NPU).

The communicator (430) may be configured for communicating internally between internal hardware components and with external devices (e.g., evolved node b (eNodeB, eNB), next generation Node B (gNodeB, gNB), server, etc.) via one or more networks (e.g., Radio technology). The communicator (430) may include an electronic circuit specific to a standard that allows wired or wireless communication.

The CHO controller (440) may be implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the CHO controller (440) may include a CHO configuration engine (441), an action controller (442), a RAN slice controller (443), and a bandwidth detector (444).

In an embodiment, the CHO configuration engine (441) may receive a CHO configuration from a first cell (500) (not shown in FIG. 4) in a wireless network. Furthermore, the CHO configuration engine (441) may receive the list of the plurality of the candidate neighbor cells (600) along with the CHO configuration.

In an embodiment, the action controller (442) may execute measurement information of the plurality of the candidate neighbor cells (600) of the list to the wireless network upon receiving the CHO configuration. Furthermore, the action controller (442) may initiate a data transmission using a RAN slice(s) associated with a service or application with the first cell (500). Furthermore, the action controller (442) may detect the plurality of candidate neighbor cells (600) of the first cell (500) satisfying the CHO configuration. Furthermore, the action controller (442) determines a plurality of conditions (e.g., A3 and/or A5 measurement event) associated with each neighbor cell (600). Furthermore, the action controller (442) may determine whether the plurality of conditions associated with each neighbor cell (600) meets requirement of the CHO configuration. Furthermore, the action controller (442) detects the plurality of the candidate neighbor cells (600), where the plurality of the candidate neighbor cells (600) meets the requirement of the CHO configuration.

In an embodiment, the RAN slice controller (443) may determine whether a second cell (not shown in FIG. 4) supports the RAN slice from the plurality of the candidate neighbor cells. Furthermore, the RAN slice controller (443) may execute a CHO to the second cell to continue the data transmission over the RAN slice(s). In an embodiment, the RAN slice controller (443) may receive the RAN slice information from a SIB that is received from the plurality of the candidate neighbor cells. In an embodiment, SIB-16 broadcast message may be introduced to identify the support of slices in the cell by the UE. From "sliceinfoList-17", the UE may determine the network slices AS groups ID which indicates which slices are supported in the cell. The network slices AS groups are indicated in "nsag-IdentityInfo-r17". One or more single network slice selection assistance information (S-NSSAI(s)) are associated with NSAG. The S-NSSAI is an identifier for a network slice across the 5GC. The mapping of NSSAI and NSAG may be derived from registration accept. If more than one candidate cells satisfy CHO condition, based on different network slicing applications (NSSAI) running in the UE, the UE may check the RAN slice support (NSAG) in the corresponding suitable candidate cells through SIB-16 of candidate cells for CHO execution. The UE may read SIB-16 to know the network slices AS groups (NSAG) supported in the cell. From the NSAG ID, the UE may determine which NSSAIs are associated with the NSAG. The candidate cell which supports the NSSAI which is currently being used by the UE's application in source cell, will be preferred for CHO execution. Furthermore, the RAN slice controller (443) may identify that the RAN slice(s) is currently being used by an application(s) of the UE (400). Furthermore, the RAN slice controller (443) may determine whether the identified RAN slice(s) is supported by any neighbor cell of the plurality of the candidate neighbor cells. The RAN slice controller (443) may select the second cell from the plurality of the candidate neighbor cells in response to determining that the identified RAN slice(s) is supported by any neighbor cell of the plurality of the candidate neighbor cells, where the second cell supports the identified RAN slice. The RAN slice controller (443) may select the second cell based on a reference signal received power (RSRP) and/or a reference signal received quality (RSRQ) and/or signal to interference and noise ratio (SINR) in response to determining that the identified RAN slice(s) is not supported by any neighbor cell of the plurality of the candidate neighbor cells. Furthermore, the RAN slice controller (443) may execute the CHO to the second cell from the plurality of the candidate neighbor cells to continue the data transmission over the RAN slice(s). In an embodiment, the UE may have the NSAG and NSSAI mapping table formed during registration accept. In case, NSSAI1 associated service application in running in UE, the network has configured the conditional handover to the UE. the RAN slice controller (443) may read the SIB 16 of all the candidate cells configured by the network to perform conditional handover. After reading SIB-16, the RAN slice controller (443) may know which NSAGs are supported in which all candidate cells. Once NSAGs are know, from the table, the RAN slice controller (443) may determine which all NSSAIs are supported in the cell. If more than one cell satisfies the CHO condition, the RAN slice controller (443) may prefer the to execute the CHO to the candidate cell which has the support of NSSAI corresponding to which service application is running.

In an embodiment, the bandwidth detector (444) may receive the bandwidth information from the plurality of the candidate neighbor cells via system information block (SIB). The bandwidth detector (444) may determines the bandwidth information after reading the SIB. In an embodiment, in the SIB1, "servingCellConfigCommonSIB" IE may be provided by the network from where the carrier bandwidth is known to the UE. Once the UE may decode the SIB1, the UE may read IE "servingCellConfigCommonSIB". From "servingCellConfigCommonSIB", the UE may knows about the "DownlinkConfigCommonSIB". In "DownlinkConfigCommonSIB", the UE may know about "FrequencyInfoDL-SIB". In "FrequencyInfoDL-SIB", "scs-SpecificCarrierList" may be provided by the network.

In "scs-SpecificCarrierList", the UE may check the carrier Bandwidth corresponding to SCS. From this IE, the cell bandwidth may be determined by the UE. Furthermore, the bandwidth detector (444) may execute the CHO to the second cell from the plurality of the candidate neighbor cells based on the received bandwidth information to continue the data transmission over the RAN slice(s) along with higher throughput. Furthermore, the bandwidth detector (444) may receive the bandwidth information in the SIB from the plurality of the candidate neighbor cells.

Furthermore, the bandwidth detector (444) may determine whether any neighbor cell (e.g., second cell) has a higher bandwidth than the other candidate neighbor cells (e.g., third cell, fourth cell, etc.) and the first cell. Furthermore, the bandwidth detector (444) may selects the second cell from the plurality of the candidate neighbor cells in response to determining that any neighbor cell has the higher bandwidth than the other candidate neighbor cells and the first cell, where the second cell has the higher bandwidth than the other candidate neighbor cells and the first cell. Furthermore, the bandwidth detector (444) may select the second cell based on the RSRP and/or the RSRQ and/or the SINR in response to determining that all neighbor cell has a lower bandwidth than the first cell. Furthermore, the bandwidth detector (444) may execute the CHO to the second cell from the plurality of the candidate neighbor cells to resume the data transmission over the RAN slice(s) along with the higher throughput.

In an embodiment, the CHO controller (440) may determines whether the identified RAN slice(s) is supported by any neighbor cell, and whether any neighbor cell has the higher bandwidth than the other candidate neighbor cells and the first cell. Furthermore, the CHO controller (440) may select the second cell from the plurality of the candidate neighbor cells in response to determining that the identified RAN slice(s) is supported by any neighbor cell and any neighbor cell of has the higher bandwidth than the other candidate neighbor cells and the first cell, where the second cell supports the identified RAN slice and the second cell has the higher bandwidth than the other candidate neighbor cells and the first cell. Furthermore, the CHO controller (440) may select the second cell based on the RSRP and/or the RSRQ and/or the SINR in response to determining that the identified RAN slice(s) is not supported by any neighbor cell of and all neighbor cell has the lower bandwidth than the first cell.

Although the FIG. 4 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the disclosure. One or more components can be combined together to perform same or substantially similar function to control the mobility of the UE (400) during the CHO.

Figure 5:
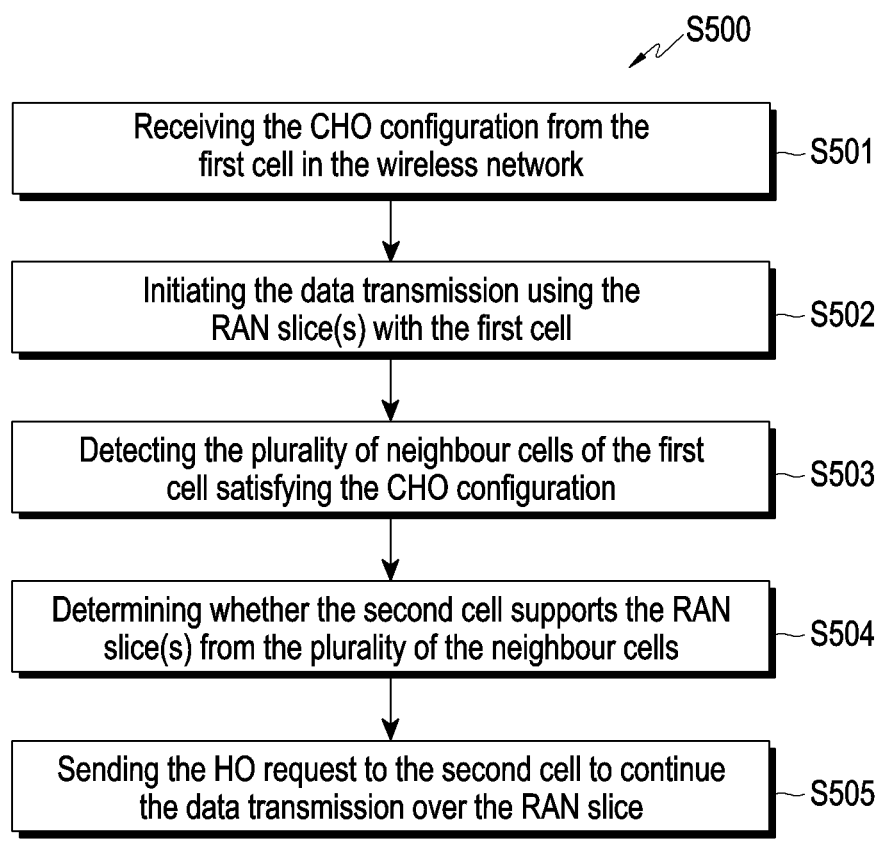
FIG. 5 is a flow diagram illustrating a method for controlling mobility during the CHO, according to an embodiment of the disclosure.

FIG. 5 is a flow diagram illustrating a method for controlling the mobility during the CHO, according to an embodiment of the disclosure. The UE (400) performs various operations (S501-S505) of flow diagram S500 to control the mobility of the UE (400) during the CHO.

At operation S501, the method may include receiving the CHO configuration from the first cell in the wireless network. At operation S502, the method may include initiating the data transmission using the RAN slice(s) with the first cell. At operation S503, the method may include detecting the plurality of candidate neighbor cells of the first cell satisfying the CHO configuration. At operation S504, the method may include determining whether the second cell supports the RAN slice(s) from the plurality of the candidate neighbor cells. At operation S505, the method may include executing the CHO to the second cell to continue the data transmission over the RAN slice(s).

The various actions, acts, blocks, steps, or the like in the flow diagram (S500) may be performed in the order presented, in a different order or simultaneously. Further, in some embodiments, some of the actions, acts, blocks, steps, or the like may be omitted, added, modified, skipped, or the like without departing from the scope of the disclosure.

Figure 6A:
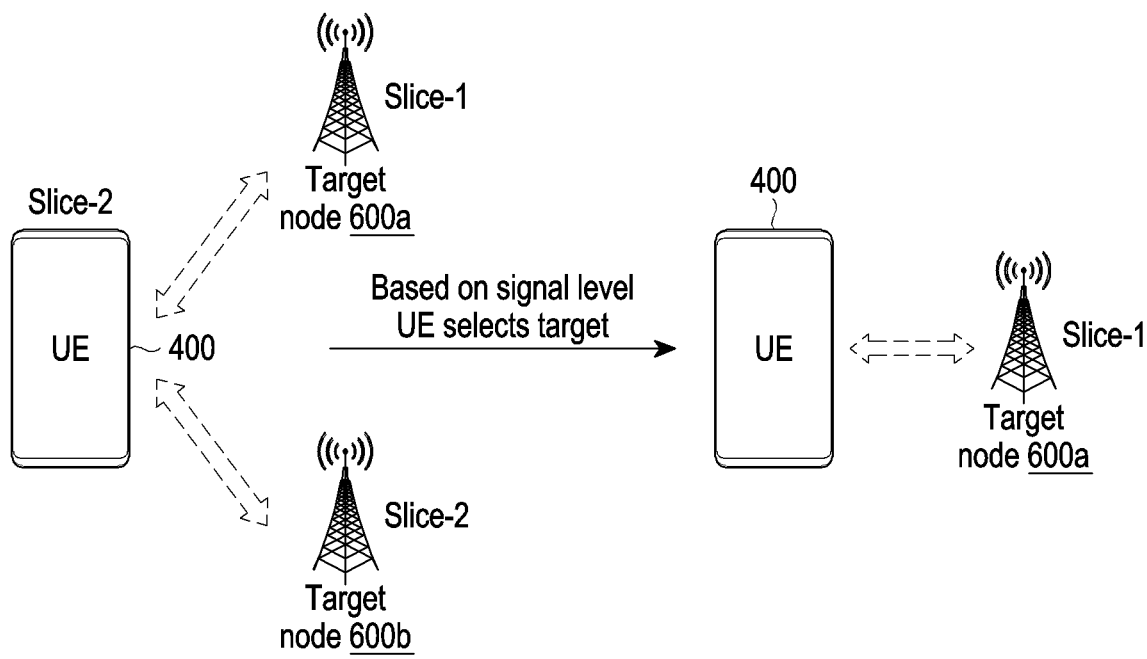
FIGS. 6A and 6B illustrate a problem scenario to select a second cell when more than one candidate neighbor cells satisfy a condition of triggering the CHO at the same time and a proposed solution for the problem scenario where the UE performs the CHO from a first cell to the second cell based on RAN slice information, according to various embodiments of the disclosure.
Figure 6B:
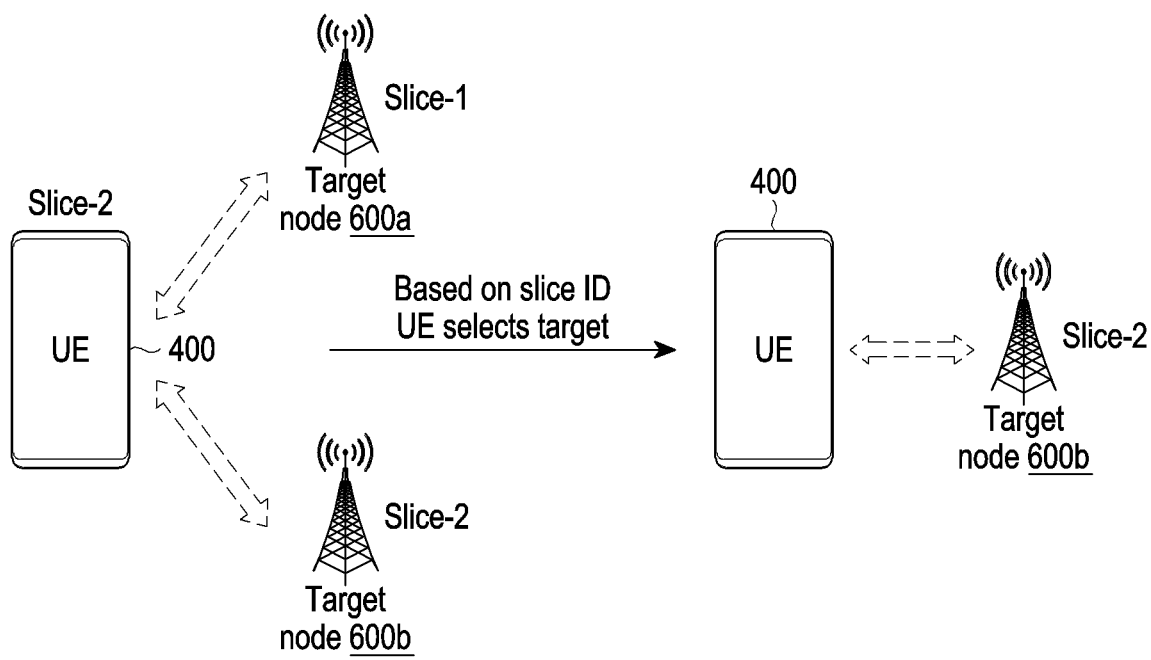

FIGS. 6A and 6B illustrate a problem scenario to select a second cell when more than one neighbor cell satisfies the condition of triggering the CHO at the same time and a proposed solution for the problem scenario where the UE performs the CHO from the first cell (not shown in FIGS. 6A and 6B) to the second cell based on RAN slice information, according to various embodiments of the disclosure.

Referring to FIG. 6A, the network (e.g., serving cell/source node/first cell) configured conditional reconfiguration information of the target node (600*a*) and the target node (600*b*) and associated evaluation conditions for both target nodes (600*a* and 600*b*) which is an A3 event. For example, a signal strength/signal level of the target node (600*a*) might be 5 dB better than a signal strength of the first cell, and a signal strength of the target node (600*b*) might be 6 dB better than the signal strength of the first cell to the UE (400).

Furthermore, the UE (400) monitors the signal strengths of the target node (600*a*) and the target node (600*b*), and the signal strength of both the target node (600*a*) and the target node (600*b*) satisfies the condition at the same time which leads the UE (400) to choose any one of the target node (600*a* or 600*b*). In this example scenario, the signal strength of the target node (600*a*) is marginally better than the signal strength of the target node (600*b*). Furthermore, the target node (600*a*) belongs to a RAN slice-1 and the target node (600*b*) belongs to a RAN slice-2 and the UE (400) is running an application that belongs to the RAN slice-2. As per the current CHO mechanism, the UE (400) selects the target node (600*a*) based on the signal strength and does not consider the RAN slice information associated with the UE (400). As a result, the running slice's (i.e., RAN slice-2) for the exclusive application will be impacted, affecting service continuity and user experience.

Referring to FIG. 6B, according to the proposed method, if more than one neighbor cell (600*a* and 600*b*) satisfy the CHO condition, the UE (400) may detect the RAN slice support in the corresponding suitable neighbor cells (600*a* and 600*b*) through the system information (e.g., SIB) for the CHO execution based on different RAN slicing applications running in the UE (400). Inclusion of a RAN slice identifier (ID) in the SIB for cell selection and reselection. In this example scenario, the neighbor cell (i.e., target node (600*b*)) that supports the RAN slice (i.e., RAN slice-2) that the application is currently using in the UE (400) in the first cell will be preferred for the CHO execution. This will ensure the continuity of a slice service-specific application and the application's QoS will be maintained.

Figure 7:
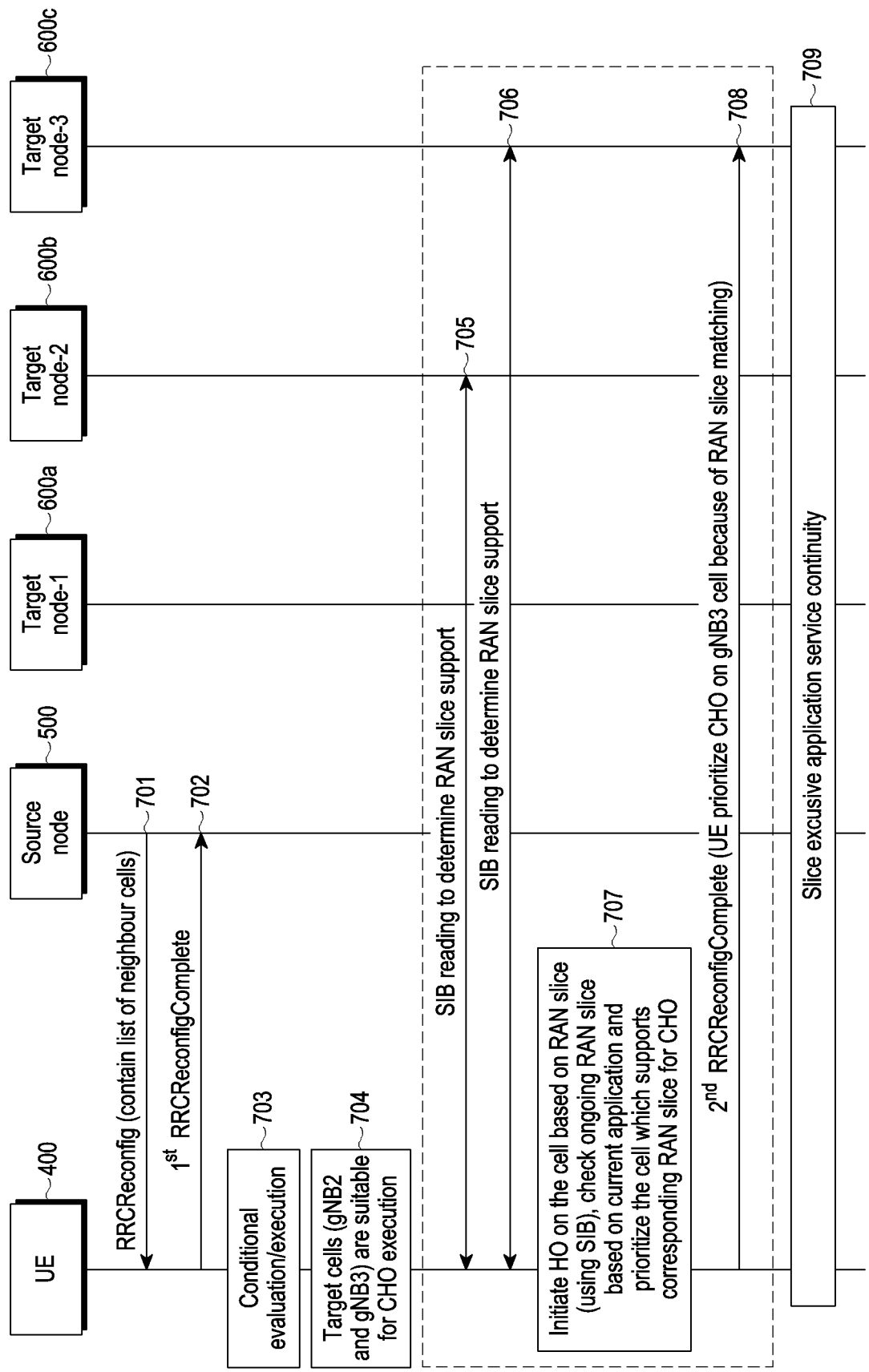
FIG. 7 is a sequence diagram illustrating the method for selecting the second cell based on the RAN slice information when more than one candidate neighbor cells satisfy the condition of triggering the CHO at the same time, according to an embodiment of the disclosure.

FIG. 7 is a sequence diagram illustrating the method for selecting a second cell based on the RAN slice information when more than one neighbor cell satisfies the condition of triggering the CHO at the same time, according to an embodiment of the disclosure.

At operation 701, the UE (400) is in connected mode, and the source node (e.g., first cell 500) configures the list of candidate neighbor cells (600) (for example, the target node-1 (600*a*), target node-2 (600*b*), and target node-3 (600*c*)) to the UE (400) in the RRC reconfiguration message to perform the CHO. At operation 702, the UE (400) may send the RRC reconfiguration complete upon receiving the RRC Reconfiguration message and stores the neighbor cell information in the UE (400). At operations 703-704, each neighbor cell (600) may contain a pair of conditions to be evaluated as well as RRC reconfiguration information, which includes reconfiguration with sync structure which contains the information such as physical cell identity (PCI), dedicated preamble to perform handover and physical, media access control (MAC) & radio link control (RLC) layers configurations that can be applied and perform CHO when the neighbor cell (600) satisfies the condition of triggering the CHO. The UE (400) may start evaluating the neighbor cell (600) conditions. In this example scenario, the target node-2 (600*b*) and the target node-3 (600*c*) may satisfy the evaluation condition at the same time to perform the CHO.

At operations 705-706, the UE (400) may detect the application running on the UE (400) and searches for RAN slices associated with the applications running on the UE (400). The UE (400) may read the system information (SIB) of each neighbor cell (i.e., target node-2 (600*b*) and target node-3 (600*c*)) and search the RAN slices supported by the respected cells (i.e., target node-2 (600*b*) and target node-3 (600*c*)) in the UE (400).

At operations 707-709, the UE (400) may determine from the SIB that the target node-3 (600*c*) supports the RAN slices associated with the applications currently running in the UE (400). The UE (400) may prioritize the target node-3 (600*c*), finish the CHO with the target node-3 (600*c*), and send the RRC reconfiguration complete message to the target node-3 (600*c*). The UE (400) may receive the slice-specific service in the target node-3 (600*c*) using the proposed method, without interfering with the application's continuity. If neither of the targets supports the slice associated with the application currently running on the UE (400), the UE (400) may select the neighbor cell (600) using the traditional method based on the signal parameters such as the RSRP/RSRQ/SINR that indicates the signal level strength.

Figure 8:
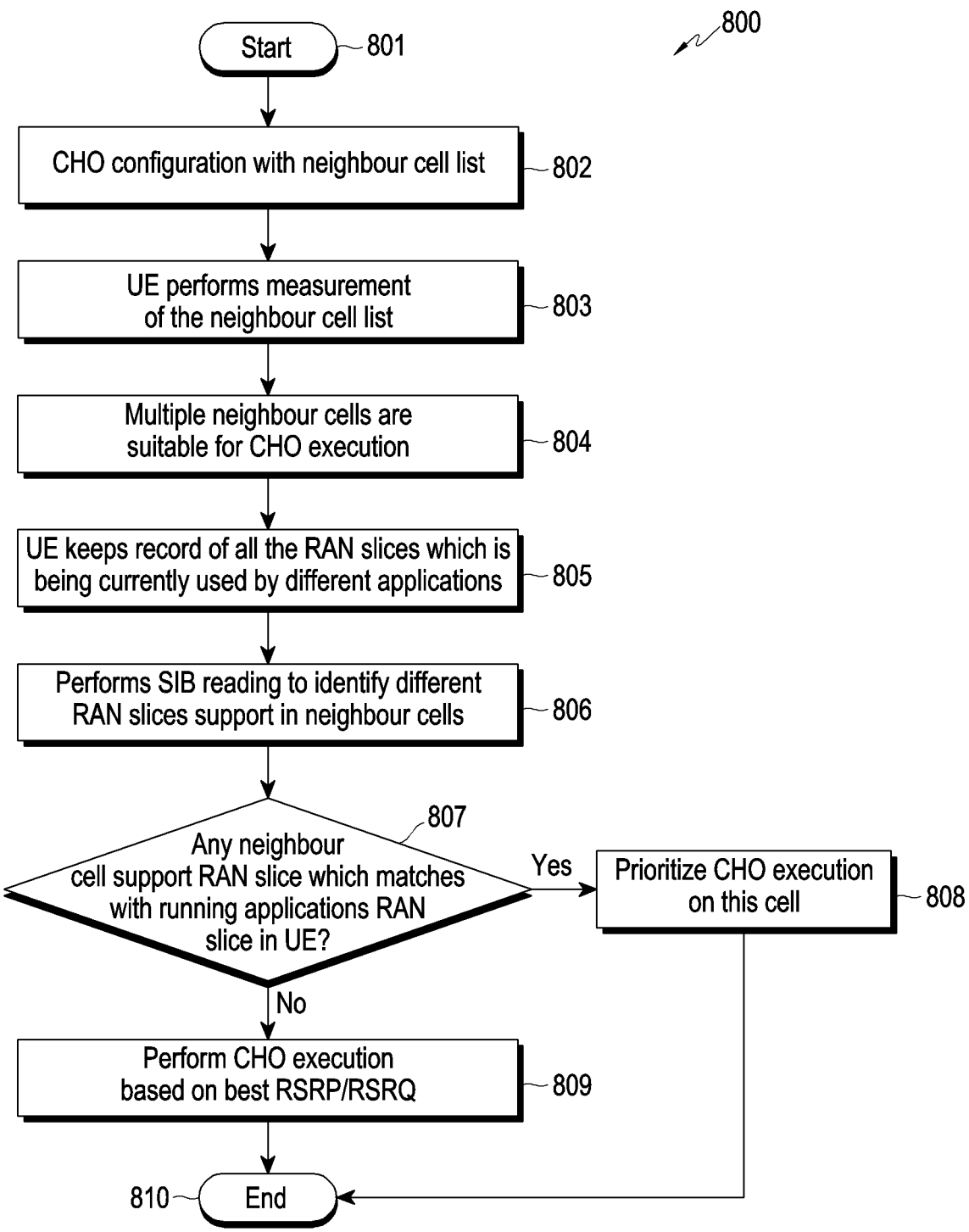
FIG. 8 is a flow diagram illustrating the method for selecting the second cell based on the RAN slice information when more than one candidate neighbor cells satisfy the condition of triggering the CHO at the same time, according to an embodiment of the disclosure.

FIG. 8 is a flow diagram illustrating the method for selecting the second cell based on the RAN slice information when more than one neighbor cell satisfies the condition of triggering the CHO at the same time, according to an embodiment of the disclosure. The operations (801-810) of the flow diagram 800 are performed by the UE (400) to control the mobility during the CHO.

At operations 801-802, the UE (400) is in connected mode, and the first cell (500) configures the list of neighbor cells (600) to the UE (400) in the RRC reconfiguration message to perform the CHO. At operations 803-804, the UE (400) may perform measurement associated with the list of neighbor cells (600) (e.g., neighbor cell list received from the first cell (500)). Each neighbor cell (600) may contain the pair of conditions to be evaluated as well as the RRC reconfiguration information, which includes reconfiguration with the sync structure that can be applied and perform the CHO when the neighbor cell (600) satisfies the condition of triggering the CHO. The UE (400) may start evaluating the neighbor cell (600) conditions and detect that multiple neighbor cell (600) satisfies the evaluation condition at the same time to perform the CHO. At operations 805-806, the UE (400) may identify the RAN slice is currently being used by the application of the UE (400). The UE (400) reads the SIB of each neighbor cell (600). At operation 807, the UE (400) may determine whether the identified RAN slice is supported by any neighbor cell (600).

At operations 808-810, the UE (400) may select/prioritize one neighbor cell (600*a* or 600*b* or 600*c*) from the plurality of the neighbor cells (600) in response to determining that the identified RAN slice is supported by one neighbor cell (600*a* or 600*b* or 600*c*) from the plurality of the neighbor cells (600), where the one neighbor cell (600*a* or 600*b* or 600*c*) (i.e., second cell) may support the identified RAN slice, finish the HO/CHO with one neighbor cell (600*a* or 600*b* or 600*c*) and send the RRC reconfiguration complete message to one neighbor cell (600*a* or 600*b* or 600*c*). The UE (400) may receive the slice-specific service in one neighbor cell (600*a* or 600*b* or 600*c*) using the proposed method, without interfering with the application's continuity. At operations 809-810, if neither of the neighbor cell (600) supports the RAN slice associated with the application currently running on the UE (400), the UE (400) may select the neighbor cell (600) using the traditional method based on the signal parameters such as the RSRP/RSRQ/SINR.

Figure 9A:
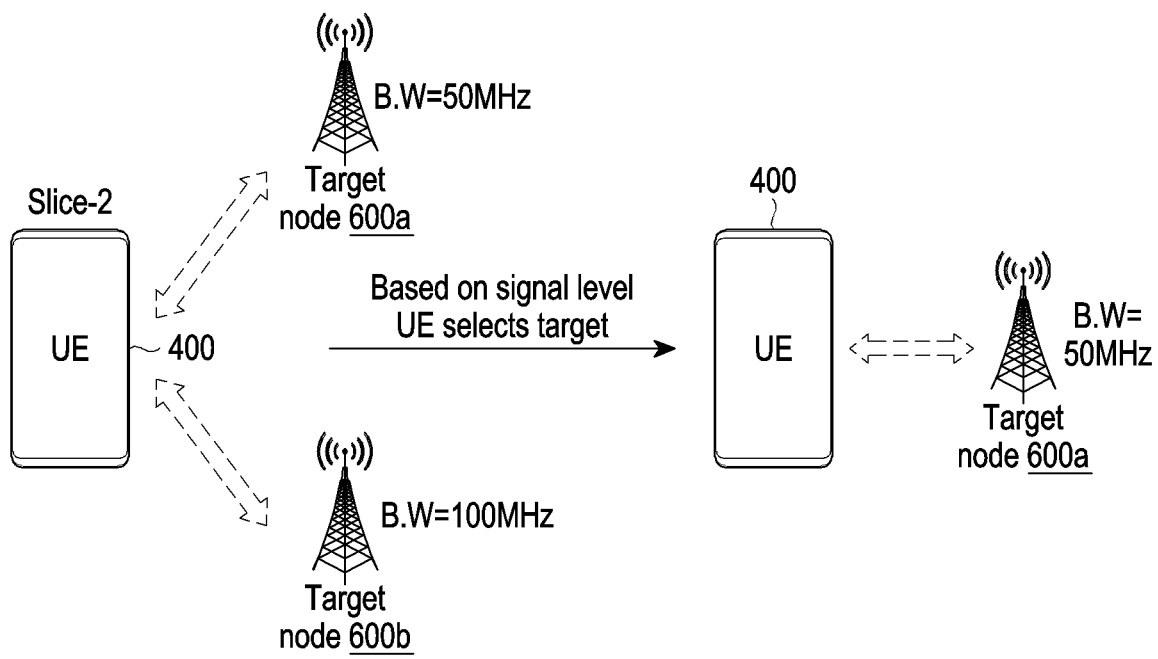
FIGS. 9A and 9B illustrate a problem scenario to select the second cell when more than one candidate neighbor cells satisfy the condition of triggering the CHO at the same time and another proposed solution for the problem scenario where the UE performs the CHO from the first cell to the second cell based on bandwidth information, according to various embodiments of the disclosure.
Figure 9B:
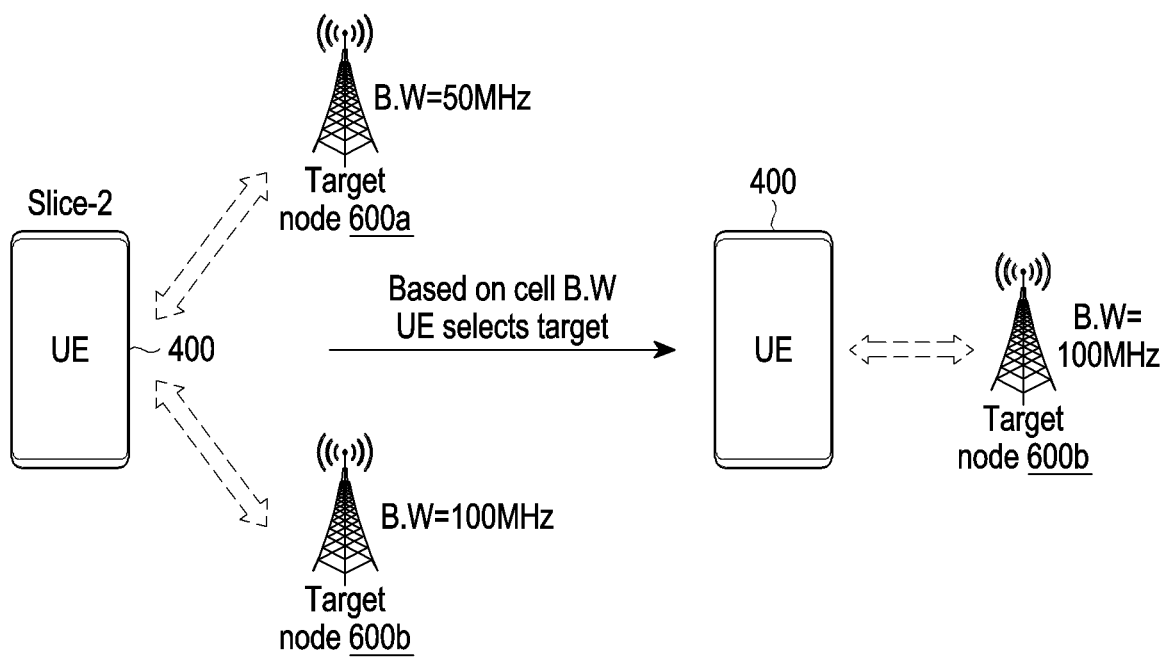

FIGS. 9A and 9B illustrate a problem scenario to select the second cell when more than one neighbor cell satisfy the condition of triggering the CHO at the same time and another proposed solution for the problem scenario where the UE performs the CHO from the first cell (not shown in FIGS. 9A and 9B) to the second cell based on bandwidth information, according to various embodiments of the disclosure.

Referring to FIG. 9A, the network (e.g., serving cell/source node/first cell (500)) configured the conditional reconfiguration information of the target node (600*a*) and the target node (600*b*) and associated evaluation conditions for both target nodes (600*a* and 600*b*) which is the A3 event. For example, the signal strength/signal level of the target node (600*a*) might be 5 dB better than the signal strength of the first cell (500) and the signal strength of the target node (600*b*) might be 6 dB better than the signal strength of the first cell (500) to the UE (400).

Furthermore, the UE (400) monitors the signal strength of the target node (600*a*) and the target node (600*b*), and the signal strength of both the target node (600*a*) and the target node (600*b*) satisfies the condition at the same time which leads the UE (400) to choose any one of the target nodes (600*a* or 600*b*). In this example scenario, the signal strength/signal level of the target node (600*a*) is marginally better than the signal strength of the target node (600*b*). Furthermore, the cell bandwidth of the target node (600*a*) is 50 MHz and the cell bandwidth of the target node (600*b*) is 100 MHz. In UE data throughput session (say, eMBB service) is ongoing where higher throughput is required. As per the current CHO mechanism, the UE (400) selects the target node (600*a*) based on the signal level and does not consider cell bandwidth. As a result, the UE (400) selects the target node (600*a*) for completing the CHO and the UE (400) has a lower bandwidth cell achieving lesser throughput though the UE (400) had a fair chance of receiving high throughput. This results in a poor user experience.

Referring to FIG. 9B, according to the proposed method, if more than one neighbor cell (600) satisfies the CHO condition, the UE (400) may detect higher bandwidth support in the corresponding suitable neighbor cells (600) through the SIB for the CHO execution. Bandwidth information of the neighbor cell (600) will be received in the SIB and this information will be used by the UE (400). In this example scenario, the neighbor cell (i.e., target node (600*b*)) which has higher bandwidth will be preferred for the CHO execution. Which provides the UE (400) better throughput and a higher data rate. The proposed method may increase the throughput after the CHO execution, which will provide better performance to the end-user.

Figure 10:
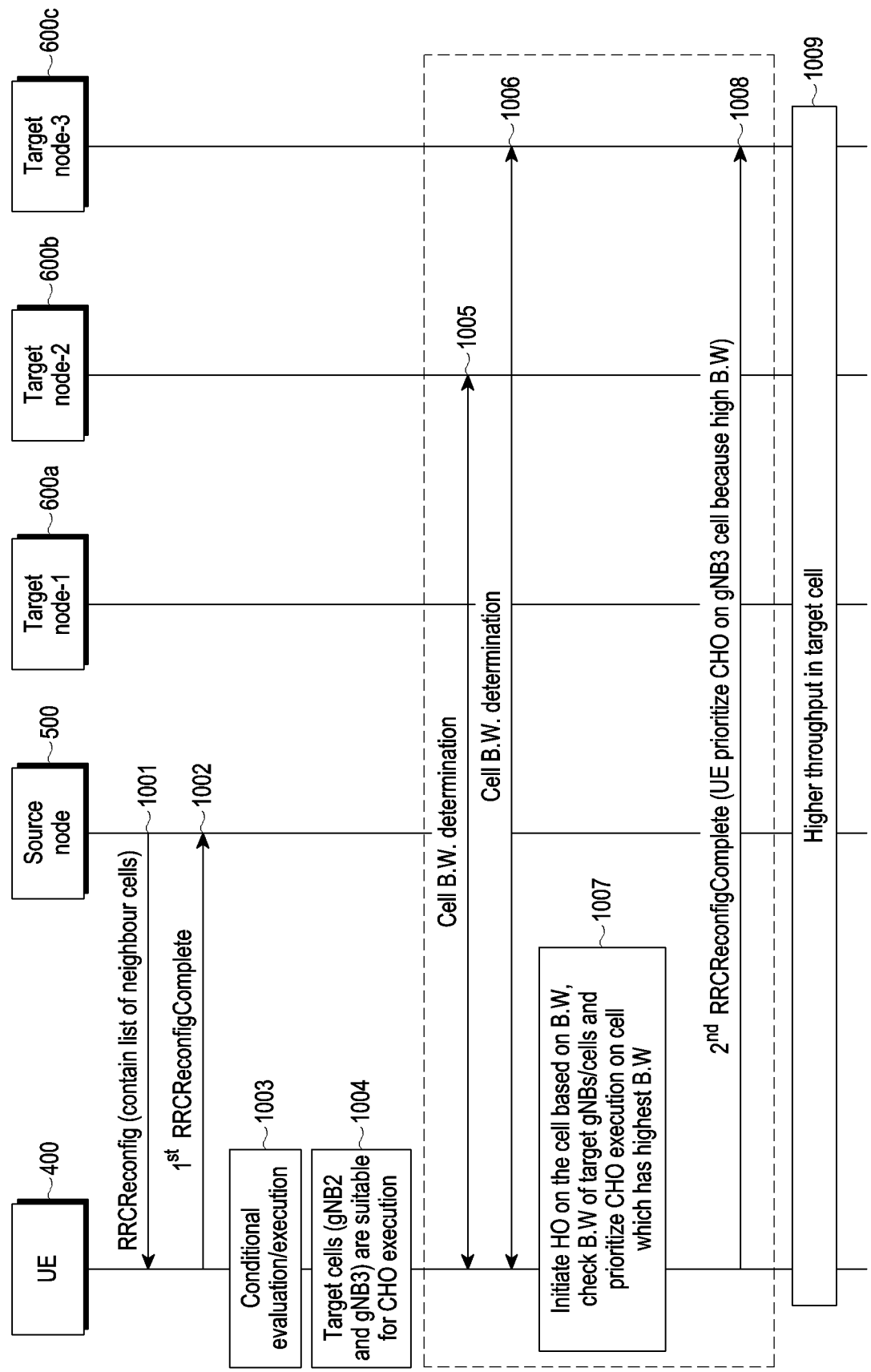
FIG. 10 is a sequence diagram illustrating the method for selecting the second cell based on the bandwidth information when more than one candidate neighbor cells satisfy the condition of triggering the CHO at the same time, according to an embodiment of the disclosure.

FIG. 10 is a sequence diagram illustrating the method for selecting the second cell based on the bandwidth information when more than one neighbor cell (600) satisfies the condition of triggering the CHO at the same time, according to an embodiment of the disclosure.

At operation 1001, the UE (400) is in connected mode, and the source node (e.g., first cell 500) configures the list of neighbor cells (600) (for example, the target node-1 (600*a*), target node-2 (600*b*), and target node-3 (600*c*)) to the UE (400) in the RRC reconfiguration message to perform the CHO. At operation 1002, the UE (400) may send the RRC reconfiguration complete upon receiving the RRC reconfiguration message and store the neighbor cell information in the UE (400). At operation 1003-1004, each neighbor cell (600) may contain the pair of conditions to be evaluated as well as RRC reconfiguration information, which includes reconfiguration with sync structure that can be applied and perform the HO when the neighbor cell (600) satisfies the condition of triggering the CHO. The UE (400) may start evaluating the neighbor cell (600) conditions. In this example scenario, the target node-2 (600*b*), and the target node-3 (600*c*) satisfies the evaluation condition at the same time to perform the CHO.

At operations 1005-1006, the UE (400) may read the system information (SIB) of each neighbor cell (i.e., target node-2 (600*b*) and target node-3 (600*c*)) and determine the higher bandwidth one neighbor cell (i.e., target node-3 (600*c*)) among the neighbor cell (600) for the CHO execution. At operations 1007-1009, the UE (400) may determine from the SIB that the target node-3 (600*c*) supports higher bandwidth. The UE (400) may prioritize the target node-3 (600*c*), finish the CHO with the target node-3 (600*c*), and send the RRC reconfiguration complete message to the target node-3 (600*c*). The UE (400) may receive the slice-specific service in the target node-3 (600*c*) using the proposed method, without interfering with the application's continuity. If neither of the targets supports the slice associated with the application currently running on the UE (400), the UE (400) may select the neighbor cell (600) using the traditional method based on signal parameters such as RSRP/RSRQ/SINR (Signal level).

Figure 11:
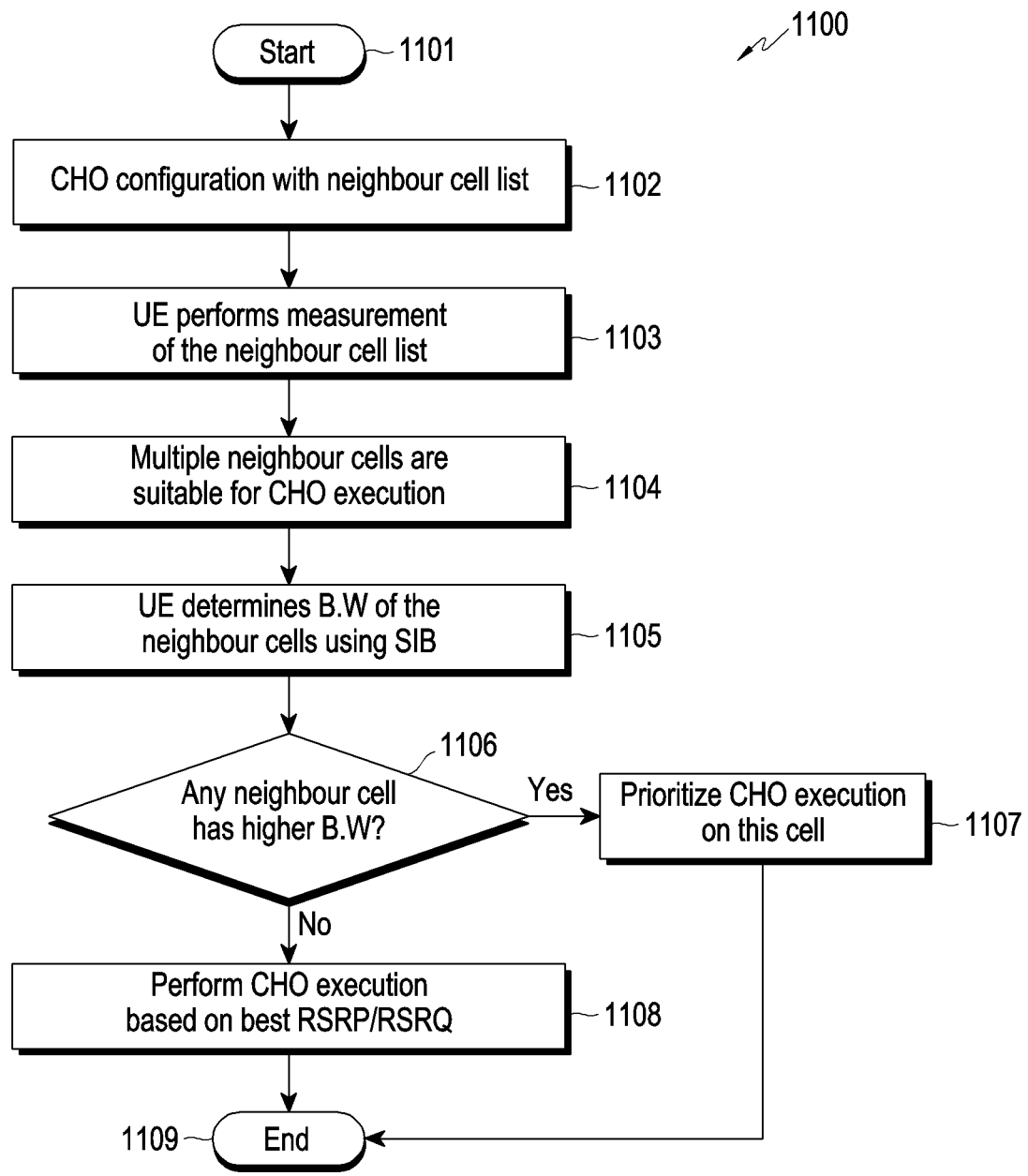
FIG. 11 is a flow diagram illustrating the method for selecting the second cell based on the bandwidth information when more than one candidate neighbor cells satisfy the condition of triggering the CHO at the same time, according to an embodiment of the disclosure.

FIG. 11 is a flow diagram illustrating the method for selecting the second cell (e.g., 600*a* or 600*b* or 600*c*) based on the bandwidth information when more than one neighbor cell (600) satisfies the condition of triggering the CHO at the same time, according to an embodiment of the disclosure. The operations (1101-1109) of flow diagram 1100 are performed by the UE (400) to control mobility during the CHO.

At operations 1101-1102, the UE (400) is in connected mode, and the first cell (500) configures the list of neighbor cells (600) to the UE (400) in the RRC reconfiguration message to perform the CHO. At operations 1103-1104, the UE (400) may perform measurement associated with the list of neighbor cells (600) (e.g., neighbor cell list received from the first cell (500)). Each neighbor cell (600) may contain the pair of conditions to be evaluated as well as the RRC reconfiguration information, which includes reconfiguration with the sync structure that can be applied and perform the CHO/HO when the neighbor cell (600) satisfy the condition of triggering the CHO. The UE (400) may start evaluating the neighbor cell (600) conditions and detects that multiple neighbor cell (600) satisfies the evaluation condition at the same time to perform the CHO.

At operation 1105, the UE (400) may read the SIB of each neighbor cell (600). At operation 1106, the UE (400) may determine whether any neighbor cell (600*a* or 600*b* or 600*c*) has a higher bandwidth than the other neighbor cells (600) and the first cell (500). At operations 1107-1109, the UE (400) may select/prioritize one neighbor cell (600*a* or 600*b* or 600*c*) from the plurality of the neighbor cells (600) in response to determining that the identified RAN slice is supported by one neighbor cell (600*a* or 600*b* or 600*c*) from the plurality of the neighbor cells (600), where the one neighbor cell (600*a* or 600*b* or 600*c*) (i.e., second cell) has the higher bandwidth, finish the CHO with one neighbor cell (600*a* or 600*b* or 600*c*) and send the RRC reconfiguration complete message to one neighbor cell (600*a* or 600*b* or 600*c*). The UE (400) may receive the slice-specific service in one neighbor cell (600*a* or 600*b* or 600*c*) using the proposed method, without interfering with the application's continuity with higher throughput. At operations 1108-1109, If neither of the neighbor cell (600) supports the RAN slice associated with the application currently running on the UE (400), the UE (400) may select the neighbor cell (600) using the traditional method based on signal parameters such as the RSRP/RSRQ/SINR.

Figure 12A:
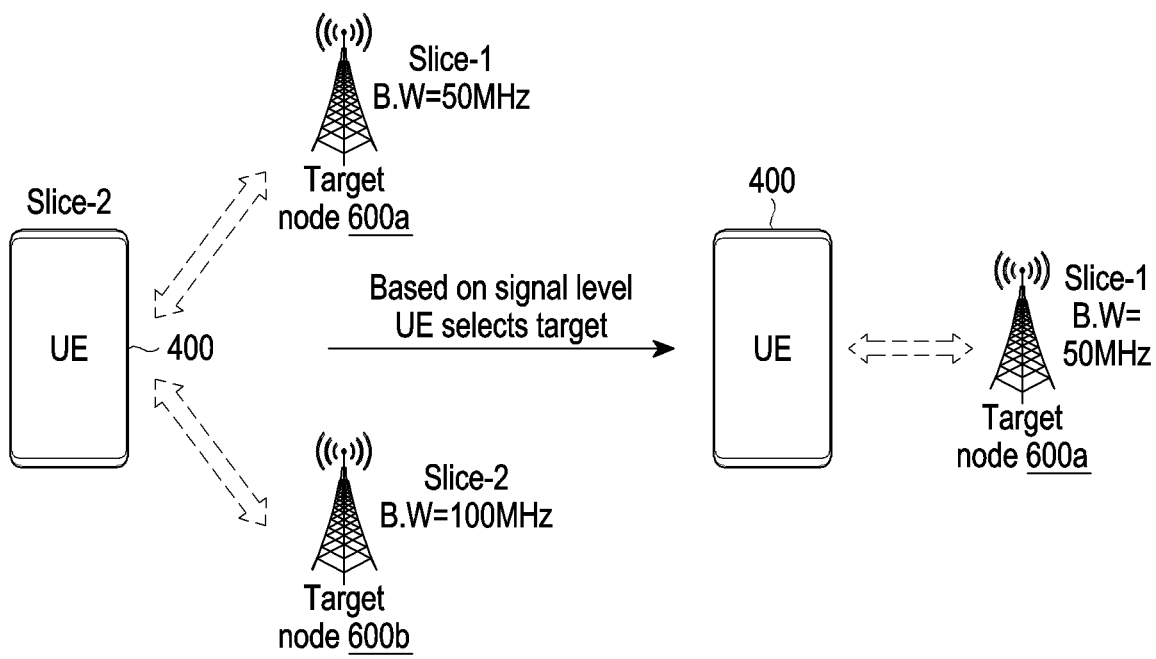
FIGS. 12A and 12B illustrate a problem scenario to select the second cell when more than one candidate neighbor cells satisfy the condition of triggering the CHO at the same time and another proposed solution for the problem scenario where the UE performs the CHO from the first cell to the second cell based on the RAN slice information and the bandwidth information, according to various embodiments of the disclosure.
Figure 12B:
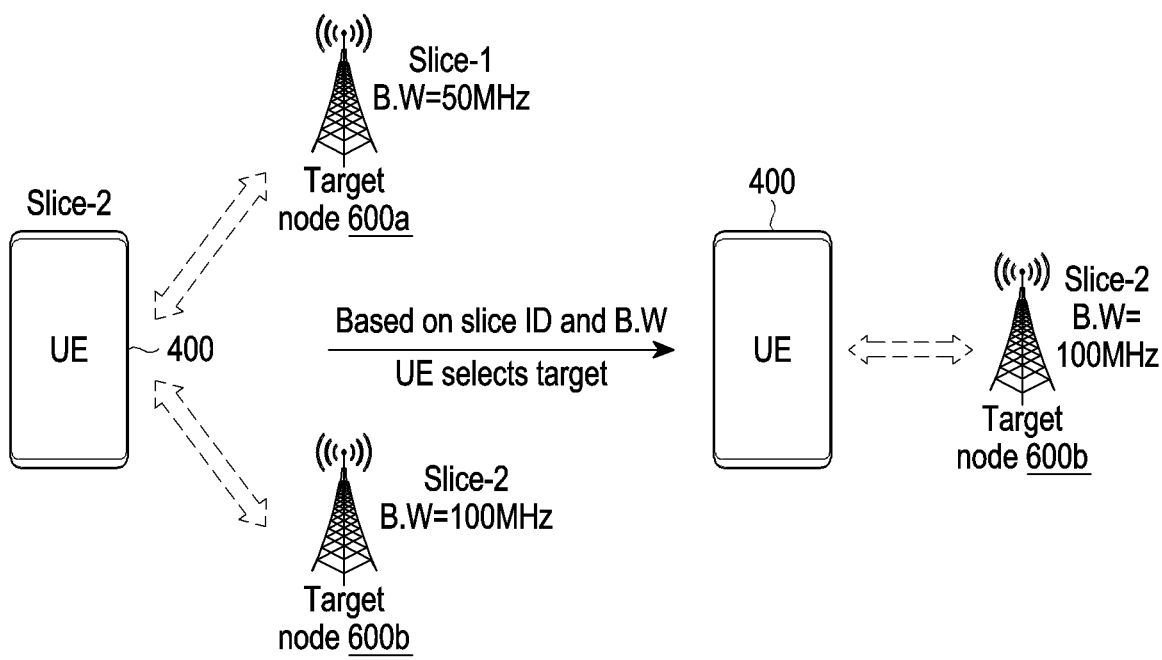

FIGS. 12A and 12B illustrate a problem scenario to select the second cell when more than one neighbor cells satisfy the condition of triggering the CHO at the same time and another proposed solution for the problem scenario where the UE performs the CHO from the first cell to the second cell based on the RAN slice information and the bandwidth information, according to various embodiments of the disclosure.

Referring to FIG. 12A, the network (e.g., serving cell/source node/first cell (500)) configured conditional reconfiguration information of the target node (600*a*) and the target node (600*b*) and associated evaluation conditions for both target nodes (600*a* and 600*b*) which is A3 event (For example, target node (600*a*) might be 5 dB better than the first cell (500) and the target node (600*b*) might 6 dB better than the first cell (500)) to the UE (400).

Furthermore, the UE (400) monitors the target node (600*a*) and the target node (600*b*), and both the target node (600*a*) and the target node (600*b*) satisfies the condition at the same time which leads the UE (400) to choose any one of the target nodes (600*a* or 600*b*). In this example scenario, a signal level of the target node (600*a*) is marginally better than the target node (600*b*). Furthermore, the target node (600*a*) belongs to a RAN slice-1 with the cell bandwidth of 50 MHz and the target node (600*b*) belongs to a RAN slice-2 with the cell bandwidth of 100 MHz and the UE (400) is running an application that belongs to the RAN slice-2. As per the current CHO mechanism, the UE (400) selects the target node (500*a*) based on the signal level and does not consider the RAN slice information associated with the UE (400) and B.W. information. As a result, the UE (400) will receive RAN slice-1 service in the target node (600*a*) but it will be on a lower bandwidth cell achieving lesser throughput though the UE (400) had a fair chance of receiving high throughput. This results in a poor user experience.

Referring to FIG. 12B, according to the proposed method, if more than one neighbor cell (600) satisfies the CHO condition, the UE (400) may detect the RAN slice support and the higher bandwidth in the corresponding suitable neighbor cells (600) through the system information (SIB) for the CHO execution based on different RAN slicing applications running in the UE (400) and support the higher bandwidth. In this example scenario, the neighbor cell (i.e., target node (600*b*)) that supports the RAN slice (i.e., RAN slice-2) that the application is currently using in the UE (400) in the first cell (500) and supports the higher bandwidth will be preferred for the CHO execution. This will ensure the continuity of the slice service-specific application and the application's QOS will be maintained without degradation and increase the throughput after the CHO execution, which provides better performance to the end-user.

Figure 13:
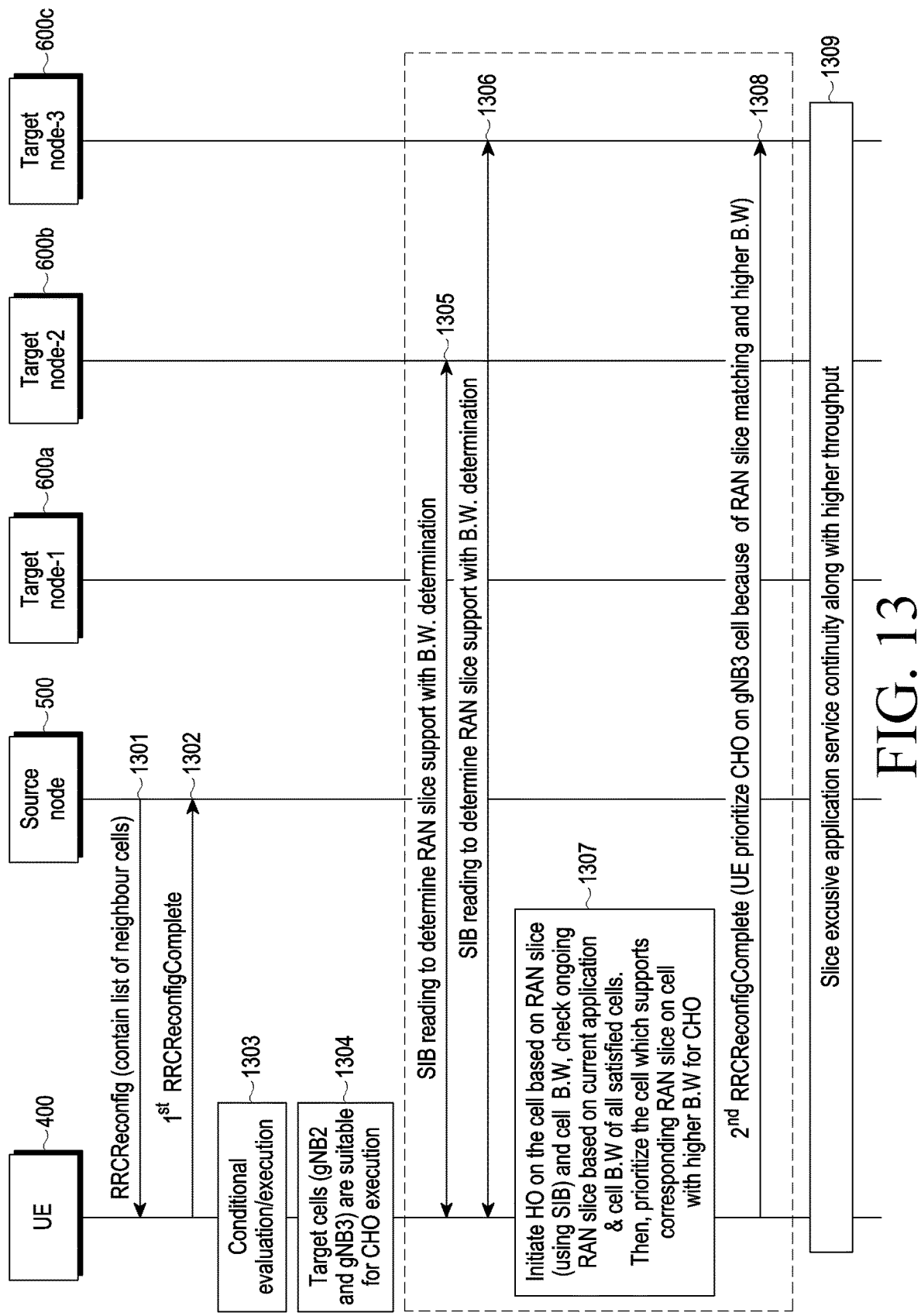
FIG. 13 is a sequence diagram illustrating the method for selecting the second cell based on the RAN slice information and the bandwidth information when more than one candidate neighbor cells satisfy the condition of triggering the CHO at the same time, according to an embodiment of the disclosure.

FIG. 13 is a sequence diagram illustrating the method for selecting the second cell based on the RAN slice information and the bandwidth information when more than one neighbor cell satisfies the condition of triggering the CHO at the same time, according to an embodiment of the disclosure.

At operation 1301, the UE (400) is in connected mode, and the source node (e.g., first cell 500) configures the list of neighbor cells (600) (for example, the target node-1 (600*a*), target node-2 (600*b*), and target node-3 (600*c*)) to the UE (400) in the RRC reconfiguration message to perform the CHO. At operation 1302, the UE (400) may send the RRC reconfiguration complete upon receiving the RRC reconfiguration message and store the neighbor cell information in the UE (400). At operations 1303-1304, each neighbor cell (600) may contain the pair of conditions to be evaluated as well as RRC Reconfiguration information, which includes reconfiguration with sync structure that can be applied and performs the HO when the neighbor cell (600) satisfies the condition of triggering the CHO. The UE (400) may start evaluating the neighbor cell (600) conditions. In this example scenario, the target node-2 (600b), and the target node-3 (600c) satisfies the evaluation condition at the same time to perform the CHO.

At operations 1305-1306, the UE (400) may detect the application running on the UE (400) and search for RAN slices associated with the applications running on the UE (400). The UE (400) reads the system information (e.g., SIB) of each neighbor cell (i.e., target node-2 (600b) and target node-3 (600c)) and searches the RAN slices supported by the respected cells along with higher bandwidth (i.e., target node-2 (600b) and target node-3 (600c)) in the UE (400).

At operations 1307-1309, the UE (400) may determine from the SIB that the target node-3 (600c) supports the RAN slices associated with the applications currently running in the UE (400) along with higher bandwidth. The UE (400) may prioritize the target node-3 (600c), finish the CHO with the target node-3 (600c), and send the RRC reconfiguration complete message to the target node-3 (600c). The UE (400) may receive the slice-specific service in the target node-3 (600c) using the proposed method, without interfering with the application's continuity. If neither of the targets supports the slice associated with the application currently running on the UE (400), the UE (400) may select the neighbor cell (600) using the traditional method based on signal parameters such as RSRP/RSRQ/SINR (Signal level).

Figure 14:
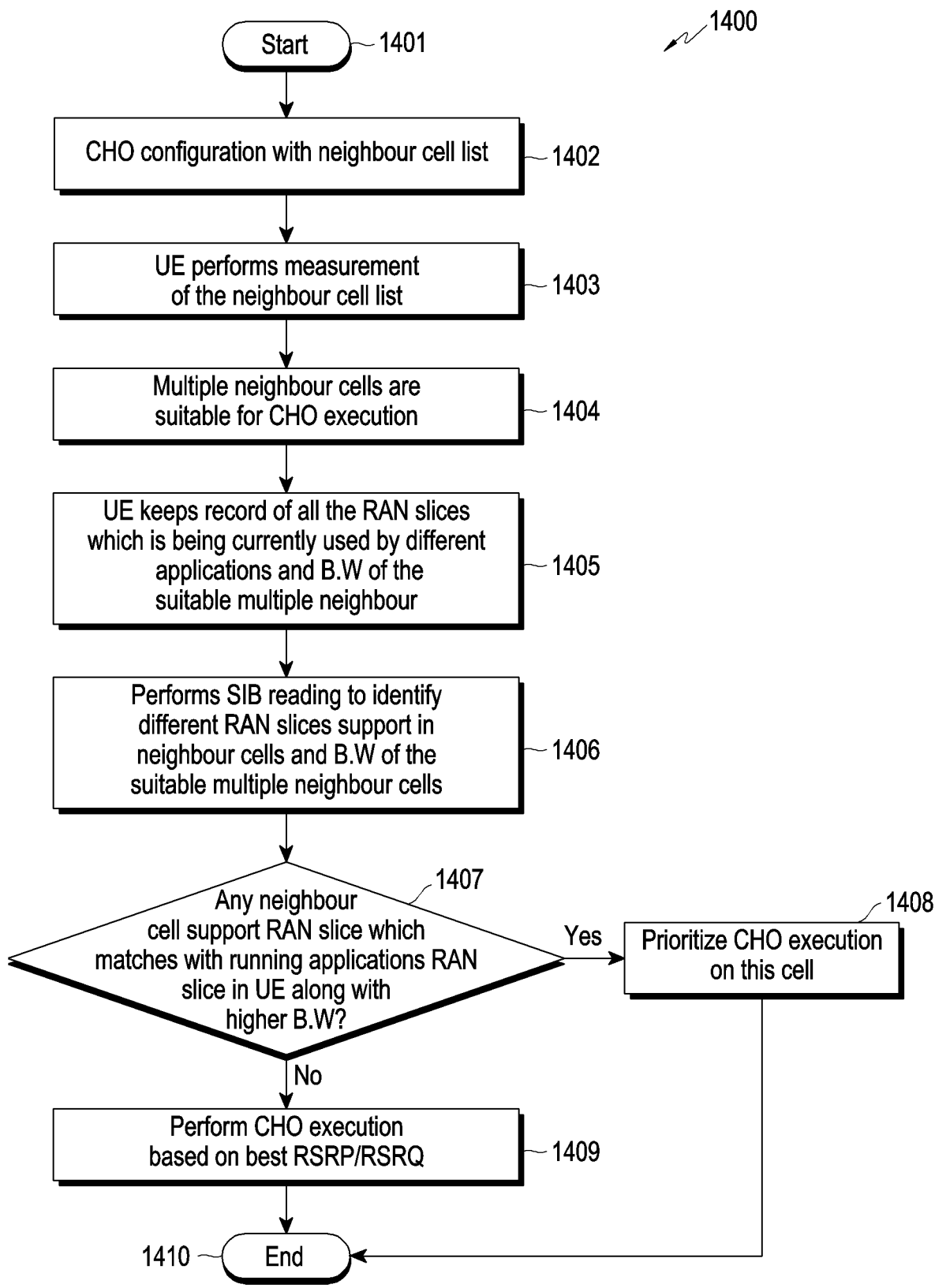
FIG. 14 is a flow diagram illustrating the method for selecting the second cell based on the RAN slice information and the bandwidth information when more than one candidate neighbor cells satisfy the condition of triggering the CHO at the same time, according to an embodiment of the disclosure.

FIG. 14 is a flow diagram illustrating the method for selecting the second cell based on the RAN slice information and the bandwidth information when more than one neighbor cell satisfies the condition of triggering the CHO at the same time, according to an embodiment of the disclosure. The operations (1401-1410) of flow diagram 1400 are performed by the UE (400) to control mobility during the CHO.

At operations 1401-1402, the UE (400) is in connected mode, and the first cell (500) configures the list of neighbor cells (600) to the UE (400) in the RRC reconfiguration message to perform the CHO. At operations 1403-1404, the UE (400) may perform measurement associated with the list of neighbor cells (600) (e.g., neighbor cell list received from the first cell (500)). Each neighbor cell (600) may contain the pair of conditions to be evaluated as well as the RRC reconfiguration information, which includes reconfiguration with the sync structure that can be applied and perform CHO/HO when the neighbor cell (600) satisfies the condition of triggering the CHO. The UE (400) may start evaluating the neighbor cell (600) conditions and detect that multiple neighbor cells (600) satisfy the evaluation condition at the same time to perform CHO. At operations 1405-1406, the UE (400) may identify the RAN slice is currently being used by the application of the UE (400) along with higher bandwidth. The UE (400) may read the SIB of each neighbor cell (600). At operation 1407, the UE (400) may determine whether the identified RAN slice is supported by any neighbor cell (600) and whether any neighbor cell (e.g., 600a or 600b or 600c) has the higher bandwidth than the other neighbor cells (600) and the first cell (500).

At operations 1408-1410, the UE (400) may select/prioritize one neighbor cell (600a or 600b or 600c) from the plurality of the neighbor cells (600) in response to determining that the identified RAN slice is supported by one neighbor cell (600a or 600b or 600c) from the plurality of the neighbor cells (600), where the one neighbor cell (600a or 600b or 600c) (i.e., second cell) supports the identified RAN slice along with the higher B.W, finish the CHO with one neighbor cell (600a or 600b or 600c) and send the RRC reconfiguration complete message to one neighbor cell (600a or 600b or 600c). The UE (400) may receive the slice-specific service in one neighbor cell (600a or 600b or 600c) using the proposed method, without interfering with the application's continuity. At operations 1409-1410, if neither of the neighbor cell (600) supports the RAN slice associated with the application currently running on the UE (400), the UE (400) may select the neighbor cell (600) using the traditional method based on signal parameters such as the RSRP/RSRQ/SINR.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for controlling mobility of a user equipment (UE) in a wireless network, the method comprising:
   receiving, by the UE, a conditional handover (CHO) configuration from a first cell in the wireless network;
   initiating, by the UE, a data transmission using at least one radio access network (RAN) slice with the first cell;
   detecting, by the UE, a plurality of candidate neighbor cells of the first cell satisfying the CHO configuration;
   determining, by the UE, whether at least one second cell supports the at least one RAN slice from the plurality of the candidate neighbor cells; and
   executing, by the UE, a CHO to the at least one second cell to continue the data transmission over the at least one RAN slice.

2. The method of claim 1, further comprising:
   receiving, by the UE, bandwidth information from the plurality of the candidate neighbor cells; and
   executing, by the UE, the CHO to the at least one second cell from the plurality of the candidate neighbor cells based on the received bandwidth information to continue the data transmission over the at least one RAN slice along with higher throughput.

3. The method of claim 2, wherein the bandwidth information is received in a system information block (SIB) from the plurality of the candidate neighbor cells.

4. The method of claim 2, wherein executing, by the UE, of the CHO to the at least one second cell from the plurality of the candidate neighbor cells based on the received bandwidth information to continue the data transmission over the at least one RAN slice along with the higher throughput comprises:
   determining, by the UE, the bandwidth information associated with the plurality of the candidate neighbor cells;

determining, by the UE, whether at least one neighbor cell has a higher bandwidth than the other candidate neighbor cells and the first cell;

performing, by the UE, one of:
selecting the at least one second cell from the plurality of the candidate neighbor cells in response to determining that the at least one neighbor cell has the higher bandwidth than the other candidate neighbor cells and the first cell, wherein the at least one second cell has the higher bandwidth than the other candidate neighbor cells and the first cell, or selecting the at least one second cell based on at least one of a reference signal received power (RSRP), a reference signal received quality (RSRQ), or a signal to interference and noise ratio (SINR) in response to determining that all neighbor cells have a lower bandwidth than the first cell; and executing, by the UE, the CHO to the at least one second cell from the plurality of the candidate neighbor cells to resume the data transmission over the at least one RAN slice along with the higher throughput.

5. The method of claim 1, further comprising:
receiving, by the UE, a list of the plurality of the candidate neighbor cells along with the CHO configuration; and
executing, by the UE, measurement information of the plurality of the candidate neighbor cells of the list to the wireless network upon receiving the CHO configuration.

6. The method of claim 1, wherein detecting, by the UE, of the plurality of the candidate neighbor cells of the first cell satisfying the CHO configuration, comprises:
determining, by the UE, a plurality of conditions associated with each neighbor cell;
determining, by the UE, whether the plurality of conditions associated with each neighbor cell meet a requirement of the CHO configuration; and
detecting, by the UE, the plurality of the candidate neighbor cells,
wherein the plurality of the candidate neighbor cells meet the requirement of the CHO configuration.

7. The method of claim 1, wherein RAN slice information is received in a system information block (SIB) from the plurality of the candidate neighbor cells.

8. The method of claim 1, wherein executing, by the UE, of the CHO to the at least one second cell to continue the data transmission over the at least one RAN slice comprises:
identifying, by the UE, that the at least one RAN slice is currently being used by at least one application of the UE;
determining, by the UE, whether the identified at least one RAN slice is supported by at least one neighbor cell of the plurality of the candidate neighbor cells;
performing, by the UE, one of:
selecting the at least one second cell from the plurality of the candidate neighbor cells in response to determining that the identified at least one RAN slice is supported by the at least one neighbor cell of the plurality of the candidate neighbor cells, wherein the at least one second cell supports the identified RAN slice, or selecting the at least one second cell based on at least one of a reference signal received power (RSRP), a reference signal received quality (RSRQ), or a signal to interference and noise ratio (SINR) in response to determining that the identified at least one RAN slice is not supported by the at least one neighbor cell of the plurality of the candidate neighbor cells; and executing, by the UE, the CHO to the at least one second cell from the plurality of the candidate neighbor cells to continue the data transmission over the at least one RAN slice.

9. The method of claim 1, further comprising:
identifying, by the UE, that the at least one RAN slice is currently being used by at least one application of the UE;
determining, by the UE, bandwidth information associated with the plurality of the candidate neighbor cells;
determining, by the UE, whether the identified at least one RAN slice is supported by at least one neighbor cell, and whether the at least one neighbor cell has a higher bandwidth than the other candidate neighbor cells and the first cell;
performing, by the UE, one of:
selecting the at least one second cell from the plurality of the candidate neighbor cells in response to determining that the identified at least one RAN slice is supported by the at least one neighbor cell and the at least one neighbor cell of has the higher bandwidth than the other candidate neighbor cells and the first cell, wherein the at least one second cell supports the identified RAN slice and the at least one second cell has the higher bandwidth than the other candidate neighbor cells and the first cell, or selecting the at least one second cell based on at least one of a reference signal received power (RSRP), a reference signal received quality (RSRQ), or a signal to interference and noise ratio (SINR) in response to determining that the identified at least one RAN slice is not supported by the at least one neighbor cell of and all neighbor cells have a lower bandwidth than the first cell; and executing, by the UE, the CHO request to the at least one second cell from the plurality of the candidate neighbor cells to resume the data transmission over the at least one RAN slice along with the higher throughput.

10. A user equipment (UE) for controlling mobility in a wireless network, the UE comprising:
memory storing instructions; and
at least one processor communicatively coupled to the memory,
wherein the instructions, when executed by the at least one processor individually or collectively, cause the UE to:
receive a CHO configuration from a first cell in the wireless network,
initiate a data transmission using at least one Radio Access Network (RAN) slice with the first cell,
detect a plurality of candidate neighbor cells of the first cell satisfying the CHO configuration,
determine whether at least one second cell supports the at least one RAN slice from the plurality of the candidate neighbor cells, and
execute a CHO to the at least one second cell to continue the data transmission over the at least one RAN slice.

11. The UE of claim 10, wherein the instructions, when executed by the at least one processor individually or collectively, cause the UE to:
receive bandwidth information from the plurality of the candidate neighbor cells; and
execute the CHO to the at least one second cell from the plurality of the candidate neighbor cells based on the received bandwidth information to continue the data transmission over the at least one RAN slice along with higher throughput.

12. The UE of claim 11, wherein the bandwidth information is received in a system information block (SIB) from the plurality of the candidate neighbor cells.

13. The UE of claim 11, wherein the instructions, when executed by the at least one processor individually or collectively, cause the UE to, when executing the CHO to the at least one second cell from the plurality of the candidate neighbor cells based on the received bandwidth information to continue the data transmission over the at least one RAN slice along with the higher throughput:
  determine the bandwidth information associated with the plurality of the candidate neighbor cells;
  determine whether at least one neighbor cell has a higher bandwidth than the other candidate neighbor cells and the first cell;
  perform one of:
    selecting the at least one second cell from the plurality of the candidate neighbor cells in response to determining that the at least one neighbor cell has the higher bandwidth than the other candidate neighbor cells and the first cell, wherein the at least one second cell has the higher bandwidth than the other candidate neighbor cells and the first cell, or
    selecting the at least one second cell based on at least one of a reference signal received power (RSRP), a reference signal received quality (RSRQ), or a signal to interference and noise ratio (SINR) in response to determining that all neighbor cells have a lower bandwidth than the first cell; and
  execute the CHO to the at least one second cell from the plurality of the candidate neighbor cells to resume the data transmission over the at least one RAN slice along with the higher throughput.

14. The UE of claim 10, wherein the instructions, when executed by the at least one processor individually or collectively, cause the UE to:
  receive a list of the plurality of the candidate neighbor cells along with the CHO configuration; and
  execute measurement information of the plurality of the candidate neighbor cells of the list to the wireless network upon receiving the CHO configuration.

15. The UE of claim 10 wherein the instructions, when executed by the at least one processor individually or collectively, cause the UE to, when detecting of the plurality of the candidate neighbor cells of the first cell satisfying the CHO configuration:
  determine a plurality of conditions associated with each neighbor cell;
  determine whether the plurality of conditions associated with each neighbor cell meets a requirement of the CHO configuration; and
  detect the plurality of the candidate neighbor cells, wherein the plurality of the candidate neighbor cells meet the requirement of the CHO configuration.

16. The UE of claim 10, wherein RAN slice information is received in a system information block (SIB) from the plurality of the candidate neighbor cells.

17. The UE of claim 10, wherein the instructions, when executed by the at least one processor individually or collectively, cause the UE to, when executing the CHO to the at least one second cell to continue the data transmission over the at least one RAN slice:
  identify that the at least one RAN slice is currently being used by at least one application of the UE;
  determine whether the identified at least one RAN slice is supported by at least one neighbor cell of the plurality of the candidate neighbor cells;
  perform one of:
    selecting the at least one second cell from the plurality of the candidate neighbor cells in response to determining that the identified at least one RAN slice is supported by the at least one neighbor cell of the plurality of the candidate neighbor cells, wherein the at least one second cell supports the identified RAN slice, or
    selecting the at least one second cell based on at least one of a reference signal received power (RSRP), a reference signal received quality (RSRQ), or a signal to interference and noise ratio (SINR) in response to determining that the identified at least one RAN slice is not supported by the at least one neighbor cell of the plurality of the candidate neighbor cells; and
  execute the CHO to the at least one second cell from the plurality of the candidate neighbor cells to continue the data transmission over the at least one RAN slice.

18. The UE of claim 10, wherein the instructions, when executed by the at least one processor individually or collectively, cause the UE to:
  identify that the at least one RAN slice is currently being used by at least one application of the UE;
  determine bandwidth information associated with the plurality of the candidate neighbor cells;
  determine whether the identified at least one RAN slice is supported by at least one neighbor cell, and whether the at least one neighbor cell has a higher bandwidth than the other candidate neighbor cells and the first cell; and
  perform one of:
    selecting the at least one second cell from the plurality of the candidate neighbor cells in response to determining that the identified at least one RAN slice is supported by the at least one neighbor cell and the at least one neighbor cell of has the higher bandwidth than the other candidate neighbor cells and the first cell, wherein the at least one second cell supports the identified RAN slice and the at least one second cell has the higher bandwidth than the other candidate neighbor cells and the first cell, or
    selecting the at least one second cell based on at least one of a reference signal received power (RSRP), a reference signal received quality (RSRQ), or a signal to interference and noise ratio (SINR) in response to determining that the identified at least one RAN slice is not supported by the at least one neighbor cell of and all neighbor cells have a lower bandwidth than the first cell, execute the CHO request to the at least one second cell from the plurality of the candidate neighbor cells to resume the data transmission over the at least one RAN slice along with the higher throughput.

19. A user equipment (UE) for controlling mobility in a wireless network, the UE comprising:
  memory storing instructions; and
  at least one processor communicatively coupled to the memory,
  wherein the instructions, when executed by the at least one processor individually or collectively, cause the UE to:
    receive a CHO configuration from a first cell in the wireless network, initiate a data transmission using at least one radio access network (RAN) slice with the first cell, detect a plurality of candidate neighbor cells of the first cell satisfying the CHO configuration, determine whether at least one second cell supports the at least one RAN slice from the plurality of the candidate neighbor cells, receive bandwidth information from the plurality of the candidate neighbor cells, and execute a CHO to the at least one second cell based on at least one of the at least one supported RAN slice and the received bandwidth information to continue the data transmission over the at least one RAN slice along with higher throughput.

20. The UE of claim 19, wherein the instructions, when executed by the at least one processor individually or collectively, cause the UE to, when determining whether at least one second cell supports the at least one RAN slice from the plurality of the candidate neighbor cells:

identify that the at least one RAN slice is currently being used by at least one application of the UE, and send a radio resource control (RRC) reconfiguration complete message to the at least one second cell, wherein the UE receives slice-specific service in the at least one second cell without interfering with continuity of the at least one application.

* * * * *